(12) United States Patent
Maezawa et al.

(10) Patent No.: US 8,373,592 B2
(45) Date of Patent: Feb. 12, 2013

(54) INITIAL POSITION DETERMINATION METHOD, POSITIONING METHOD, AND POSITIONING APPARATUS

(75) Inventors: Hidekazu Maezawa, Nagano (JP);
Kiyotaka Muraki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 143 days.

(21) Appl. No.: 12/539,302

(22) Filed: Aug. 11, 2009

(65) Prior Publication Data
US 2010/0176988 A1    Jul. 15, 2010

(30) Foreign Application Priority Data

Aug. 20, 2008 (JP) ................................ 2008-211481
Jul. 23, 2009 (JP) ................................ 2009-171887

(51) Int. Cl.
*G01S 19/42* (2010.01)
*G01S 19/06* (2010.01)
(52) U.S. Cl. .............................. 342/357.25; 342/357.43
(58) Field of Classification Search ............. 342/357.43, 342/357.63, 357.67–357.69, 357.25
See application file for complete search history.

(56) References Cited

U.S. PATENT DOCUMENTS

| 6,560,536 B1 * | 5/2003 | Sullivan et al. | 701/214 |
| 6,865,478 B2 * | 3/2005 | Sirola et al. | 701/207 |
| 7,864,108 B2 * | 1/2011 | Kurata | 342/357.43 |
| 2006/0273954 A1 * | 12/2006 | Diggelen | 342/357.02 |

FOREIGN PATENT DOCUMENTS

| JP | 06265626 A * | 9/1994 |
| JP | 2006-071460 A | 3/2006 |

* cited by examiner

*Primary Examiner* — Cassie Galt
(74) *Attorney, Agent, or Firm* — Global IP Counselors, LLP

(57) ABSTRACT

A method of determining an initial position in executing a positioning calculation based on satellite signals from positioning satellites, includes: (a) executing position converging calculation based on the satellite signals using each of a plurality of first candidate positions as a provisional initial position; (b) selecting at least one second candidate position from the first candidate positions based on a calculation result of the position converging calculation; and (c) selecting the initial position from one of the second candidate positions using the satellite signals.

6 Claims, 21 Drawing Sheets

121

1211 1213

| CAPTURING OBJECT SATELLITE | ACTUAL MEASUREMENT VALUE | |
|---|---|---|
| | CODE PHASE | DOPPLER FREQUENCY |
| S1 | CP1 | Freq1 |
| S2 | CP2 | Freq2 |
| S3 | CP3 | Freq3 |
| ⋮ | ⋮ | ⋮ |

FIG.10

| FRAME No. | GRID POINT No. | POSITIONAL COORDINATES | FIRST APR VALUE |
|---|---|---|---|
| F1 | G1-1 | (X1-1,Y1-1,Z1-1) | 364 |
| | G1-2 | (X1-2,Y1-2,Z1-2) | 375 |
| | G1-3 | (X1-3,Y1-3,Z1-3) | 286 |
| | ... | ... | ... |
| | G1-49 | (X1-49,Y1-49,Z1-49) | 316 |
| F2 | G2-1 | (X2-1,Y2-1,Z2-1) | 541 |
| | G2-2 | (X2-2,Y2-2,Z2-2) | 512 |
| | G2-3 | (X2-3,Y2-3,Z2-3) | 496 |
| | ... | ... | ... |
| | G2-49 | (X2-49,Y2-49,Z2-49) | 567 |
| ... | ... | ... | ... |

| FRAME No. | GRID POINT No. | POSITIONAL COORDINATES | SECOND APR VALUE |
|---|---|---|---|
| F1 | G1-12 | (X1-12,Y1-12,Z1-12) | 145 |
|  | G1-37 | (X1-37,Y1-37,Z1-37) | 121 |
| F2 | G2-24 | (X2-24,Y2-24,Z2-24) | 86 |
| F3 | G3-45 | (X3-45,Y3-45,Z3-45) | 107 |
| ⋮ | ⋮ | ⋮ | ⋮ |

INITIAL POSITION DETERMINATION METHOD, POSITIONING METHOD, AND POSITIONING APPARATUS

CROSS-REFERENCE TO RELATED APPLICATIONS

This application claims priority to Japanese Patent Application Nos. 2008-211481 and 2009-171887 filed on Aug. 20, 2008 and Jul. 23, 2009 respectively. The entire disclosure of Japanese Patent Application Nos. 2008-211481 and 2009-171887 is hereby incorporated herein by reference.

BACKGROUND

1. Technical Field

The present invention is related to an initial position determination method and the like that determines an initial position when positioning calculation is executed based on satellite signals from positioning satellites.

2. Related Art

A global positioning system (GPS) that uses a positioning signal is widely known, and is used as a positioning apparatus incorporated in, for example, a portable phone or a vehicle navigation system. In a GPS, the positioning calculation is done by obtaining values of four parameters, namely three-dimensional coordinate values representing the location of the system itself and a timepiece error, based on the information such as the locations of a plurality of GPS satellites or pseudo-ranges between the GPS satellites and the system itself. Thus, the position of the present location of the system itself can be known.

In the positioning by the GPS, since the position (hereinafter referred to as an "initial position") of the positioning apparatus, which is used as an initial value of the positioning calculation (more accurately, position converging calculation), is required, various technologies for obtaining the initial position have been invented. For example, JP-A-2006-71460 discloses a technology for determining the initial position used in present positioning calculation by using the positioning error included in the positioning location obtained by the previous positioning calculation.

The positioning apparatus in the related art generally determines the initial position using a fractional part (code phase) of the pseudo random noise (PRN) code as a kind of spread code carried by the satellite signal from the GPS satellite. The PRN code is a signal with a bit rate of 1.023 Mbps and a bit length of 1,023 bits (=1 msec=300 km). Therefore, if the initial position is in an error range of within 150 km from the true position, the position converging calculation becomes possible using the fractional part (the code phase) of the PRN code. Therefore, in the positioning calculation in the related art, the error of the initial position is required to be within 150 km.

However, in reality, in some cases, it is difficult to obtain the initial position close to the true position of the positioning device. The case in which the positioning apparatus is powered on to first perform positioning after moving by air is a typical example. Depending on circumstances, in this case, it is also possible in which the initial position is separated by 500 km or even 1,000 km distance from the true position of the positioning apparatus. Thus, there is a need for a GPS can determine an initial position close to the true position of the positioning apparatus even in the aforementioned type of case. This invention addresses this need in the art as well as other needs, which will become apparent to those skilled in the art from this disclosure.

SUMMARY

The invention has an advantage in solving the problem described above.

A first aspect of the invention is directed to a method of determining an initial position in executing a positioning calculation based on satellite signals from positioning satellites, including (a) executing a position converging calculation based on the satellite signals using each of a plurality of first candidate positions as a provisional initial position, (b) selecting at least one second candidate position from the first candidate positions based on a calculation result of the position converging calculation, and (c) selecting the initial position from the second candidate positions using the satellite signals.

Further, as a modified aspect of the invention, it is possible to configure a positioning apparatus adapted to execute a positioning calculation based on satellite signals from positioning satellites. This positioning apparatus includes a position converging calculation section, a second candidate position selection section, an initial position selection section, and a positioning section. The position converging calculation section is configured and adapted to execute a position converging calculation based on the satellite signals using each of a plurality of first candidate positions as a provisional initial position. The second candidate position selection section is configured and adapted to select at least one second candidate position from the first candidate positions based on a calculation result of the position converging calculation. The initial position selection section is configured and adapted to select an initial position in executing the positioning calculation using the satellite signals out of the second candidate positions. The positioning section is configured and adapted to execute positioning calculation based on the satellite signals using the initial position selected.

According to the first aspect of the invention, with respect to each of the plurality of first candidate positions, the position converging calculation based on the satellite signals is executed using the first candidate positions as the provisional initial positions, and based on the result of the calculations, the second candidate positions are selected from the plurality of first candidate positions. Further, the initial position in executing the positioning calculation using the satellite signals is selected from the second candidate positions thus selected.

For example, by determining whether or not the position converging calculation has converged, the plurality of candidate positions can be narrowed down to the candidate positions, which can be adopted as the initial position. Further, by selecting the initial position using the satellite signals from the candidate positions thus obtained by narrowing-down, it becomes possible to obtain the initial position close to the true position of the positioning apparatus.

Further, a second aspect of the invention is directed to the method of determining an initial position of the first aspect of the invention, and further includes (d) selecting a predetermined number of first candidate positions. The first candidate positions are based on a difference between a first distance that is calculated using a third candidate position and positions of the positioning satellites and a second distance calculated based on the satellite signals from the third candidate positions. The difference is obtained with respect to each of the third candidate positions set in a predetermined range of at least 300 km square.

According to the second aspect of the invention, a predetermined number of first candidate positions is selected, based on a difference between a first distance calculated using the third candidate position and positions of the positioning satellites and a second distance calculated based on the satellite signals, out of the third candidate positions. The difference is obtained with respect to each of third candidate positions set in a predetermined range of at least 300 km square, If the difference between the first distance calculated from the physical positional relationship between the third candidate position and the positioning satellites and the second distance calculated based on the satellite signals is small, the third candidate position has a high possibility of being located close to the location of the positioning apparatus. Therefore, by, for example, selecting a predetermined number of first candidate positions with the smaller difference between the first distance and the second distance, it becomes possible to narrow down effectively the first candidate positions in an anterior stage of the position converging calculation. Thus, since it becomes unnecessary to execute the position converging calculation on all the first candidate positions, the amount of calculation can significantly be reduced. Further, since it is arranged to set the third candidate positions in a predetermined range of at least 300 km square, it becomes possible to execute the search of the initial position taking a large area as the object.

Further, a third aspect of the invention is directed to the method of determining an initial position of the second aspect of the invention, wherein the third candidate positions are disposed in the predetermined range in a reticular pattern.

According to the third aspect of the invention, by disposing the third candidate positions in the predetermined area in a reticular pattern, the calculation with the computer becomes easy, and further, the candidate positions can evenly be distributed in the predetermined area.

Further, a fourth aspect of the invention is directed to the method of determining an initial position of any one of the first through the third aspects of the invention, and further includes the step (c) that corresponds to selecting the initial position out of the second candidate positions, based on a difference between a third distance calculated using the second candidate positions and the positions of the positioning satellites, and a fourth distance calculated based on the satellite signals.

According to the fourth aspect of the invention, the initial position is selected from the second candidate positions based on the difference between the third distance calculated using the second candidate positions and the positions of the positioning satellites and the fourth distance calculated based on the satellite signals.

If the difference between the third distance calculated from the physical positional relationship between the second candidate position and the positioning satellites and the fourth distance calculated based on the satellite signals is small, the second candidate position has a high possibility of being located close to the location of the positioning apparatus. Therefore, by, for example, selecting the second candidate position with the minimum difference between the third distance and the fourth distance to be the initial position, it is possible to obtain the initial position close to the true position of the positioning apparatus.

Further, a fifth aspect of the invention is directed to the method of determining an initial position of any one of the first through the fourth aspects of the invention, and further includes (e) determining the appropriateness of the initial position based on a difference between a first Doppler frequency and a second Doppler frequency. The first Doppler frequency is calculated using the initial position, and positions and orbits of the positioning satellites, and the second Doppler frequency is calculated based on the satellite signals.

According to the fifth aspect of the invention, the appropriateness of the initial position is determined based on the difference between the first Doppler frequency and the second Doppler frequency, the first Doppler frequency being calculated using the initial position and the positions and orbits of the positioning satellites, and the second Doppler frequency being calculated based on the satellite signals. Thus, the appropriateness of the initial position can be determined based on the Doppler frequencies.

Further, a sixth aspect of the invention is directed to the method of determining an initial position, in which determining the appropriateness of the initial position in the fifth aspect of the invention includes calculating a first Doppler frequency based on an initial position and a moving velocity vector of the positioning apparatus as well as a position and a moving velocity vector of a positioning satellite calculable from orbital information of the positioning satellite.

According to the sixth aspect of the invention, a Doppler frequency is calculated with improved accuracy due to the moving velocity and the direction of not only the positioning satellite but also the positioning apparatus being accounted for, enabling a more accurate determination as to whether the initial position is appropriate or not.

Further, a seventh aspect of the invention is directed to a positioning method of executing the positioning calculation based on the satellite signals using the initial position determined by the initial position determination method of any one of the first through the sixth aspects of the invention.

These and other objects, features, aspects, and advantages of the invention will become apparent to those skilled in the art from the following detailed description, which, taken in conjunction with the annexed drawings, discloses a preferred embodiment of the invention.

BRIEF DESCRIPTION OF THE DRAWINGS

The invention will now be described with reference to the accompanying drawings, which a form a part of the original disclosure, wherein like numbers reference like elements:

FIG. 10 is a view of a diagram showing an example of a data configuration of judgment data stored in the RAM of the portable phone;

FIG. 11 is a view of a diagram showing an example of a data configuration of grid data stored in the RAM of the portable phone;

FIG. 12 is a view of a diagram showing an example of a data configuration of candidate initial position data stored in the RAM of the portable phone;

DESCRIPTION OF EXEMPLARY EMBODIMENTS

Hereinafter, an example of a preferred embodiment of the invention will be described with reference to the accompanying drawings. It should be noted that the embodiment to which the invention is applied is not limited to the preferred embodiment.

1. System Configuration

Figure 1:
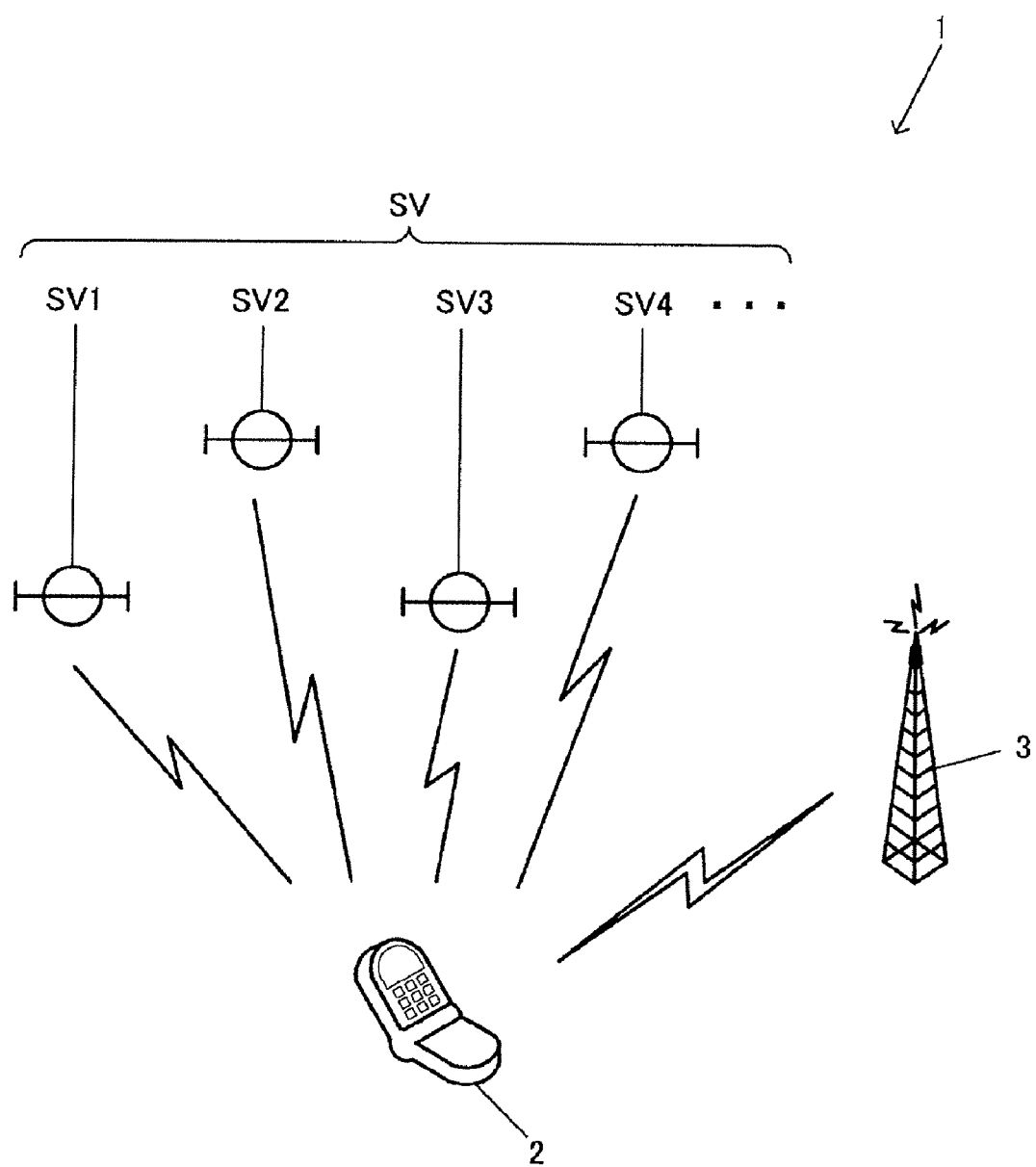
FIG. 1 is a view of a diagram showing a schematic configuration of a positioning system in accordance with a preferred embodiment of the invention.

FIG. 1 is a view of a block diagram showing a schematic configuration of a positioning system 1 according to the present embodiment. The positioning system 1 is configured to include a portable phone 2 as a kind of electronic equipment provided with a positioning apparatus, a base station 3 for the portable phone, and a plurality of GPS satellites SV (SV1, SV2, SV3, SV4, . . . ).

As stated, the portable phone 2 is an example of electronic equipment. The portable phone 2 is provided for the user to make a phone call or to perform transmission/reception of an electronic mail. The portable phone 2 has the original functions of a portable phone such as the ability to place a phone call and transmission/reception of an electronic mail by communicating with the base station 3, and has an additional function by performing positioning based on the GPS satellite signals received from the GPS satellites SV.

In the case in which a long period of time has elapsed from the first positioning or the previous positioning, the portable phone 2 requests from the base 3 an expected position of the portable phone 2. Then, the portable phone 2 acquires the expected position and the confidence (how far the expected position is distant at most from the true position of the portable phone 2) of the expected position from the base station 3. The portable phone 2 then determines the initial position used when executing the positioning calculation along the principle described later. Then, by executing the positioning calculation using the initial position thus determined, the portable phone 2 measures the position of the portable phone 2.

The base station 3 is a wireless base station installed by a service company of the portable phone, and enables the portable phone 2 to realize various functions, for example, making a phone call and transmission/reception of electronic mail by transmitting the base station signal to the portable phone 2 to perform base station communications with the portable phone 2. In response to the request from the portable phone 2, the base station 3 calculates the expected position of the portable phone 2 and the confidence of the expected position, and then provides them to the portable phone 2 as the source of the request. It should be noted that since a known method can be applied to the method of calculating the expected position and the confidence thereof, detailed explanations therefore will be omitted.

2. Principle

Figure 2:
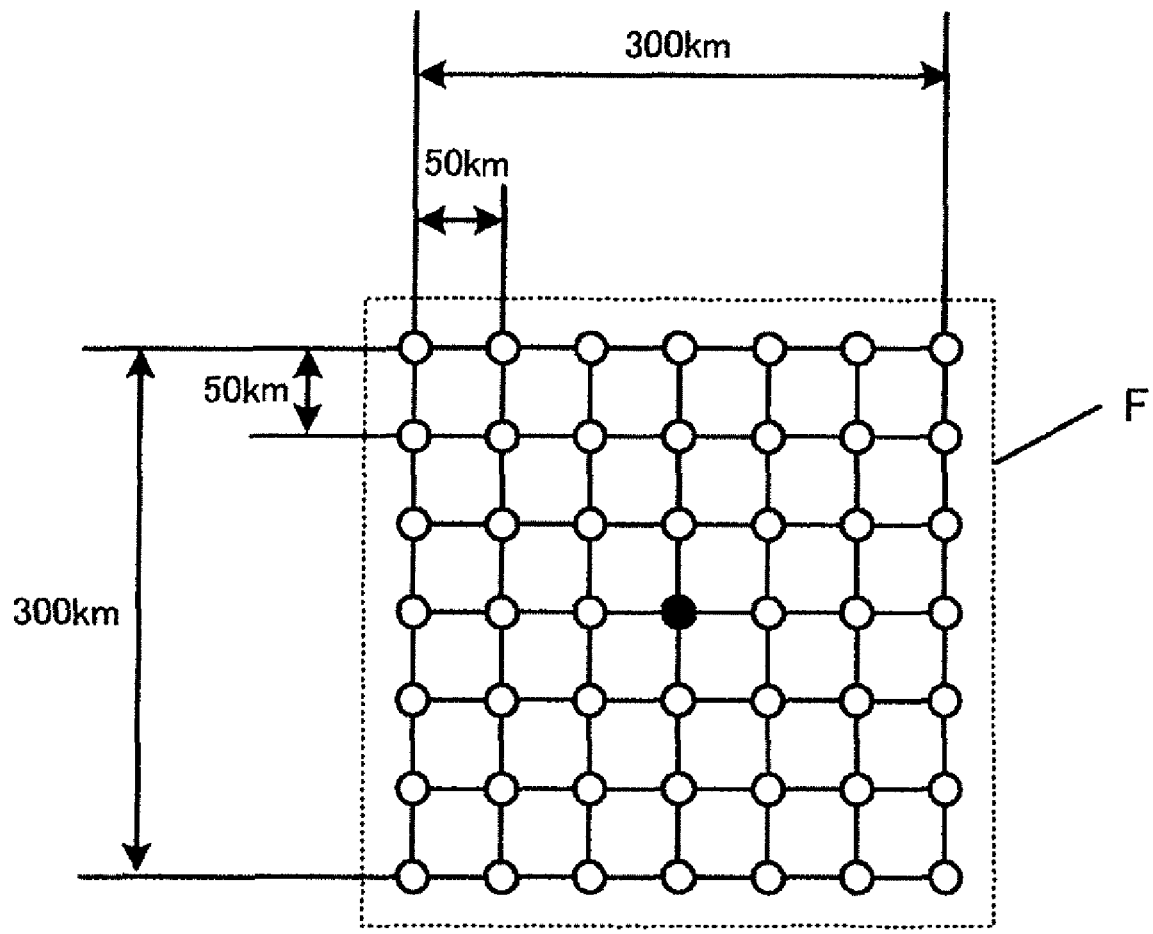
FIG. 2 is a view of a diagram illustrating a principle of determining an initial position in the positioning system.
Figure 3:
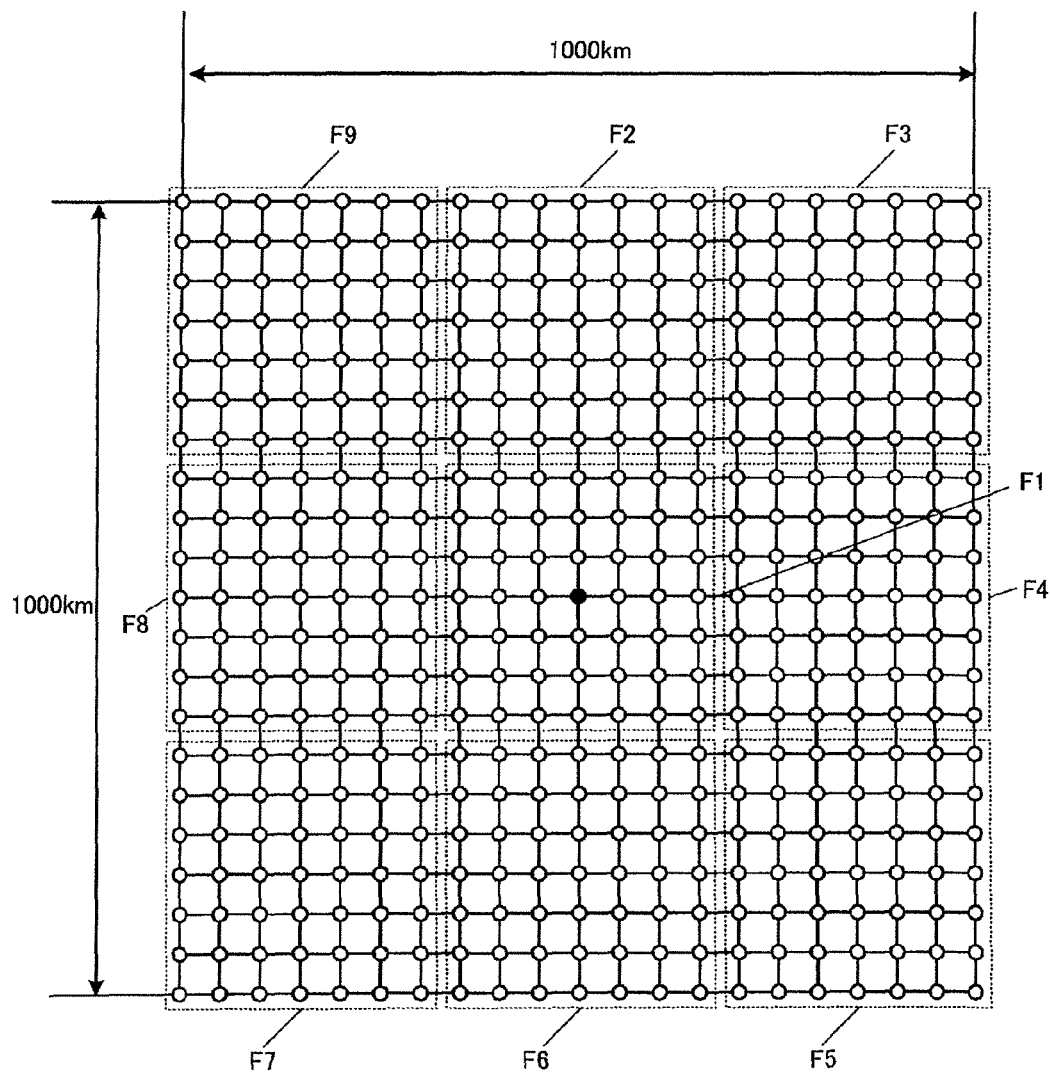
FIG. 3 is a view of a diagram further illustrating the principle of determining the initial position.
Figure 4:
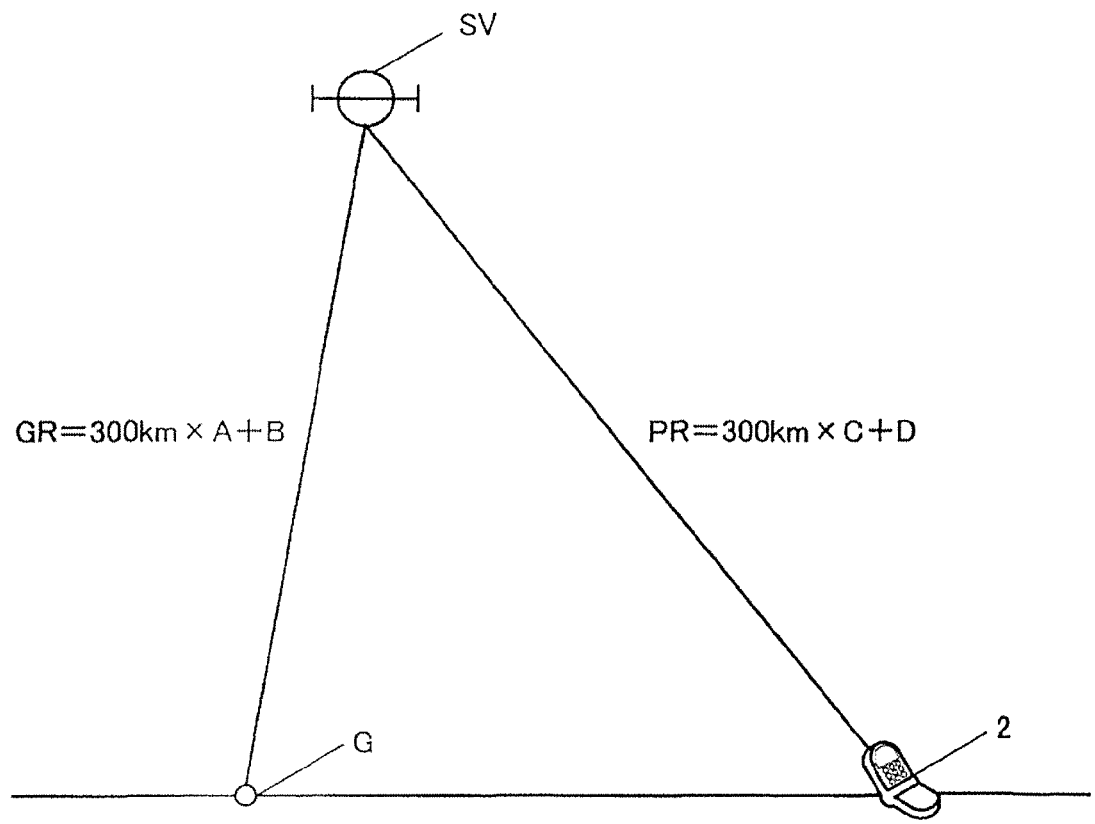
FIG. 4 is a view of a diagram even further illustrating the principle of determining the initial position.

FIGS. 2 through 4 are views of diagrams for explaining the principle of the initial position determination in the present embodiment.

The initial position becomes necessary for the portable phone 2 to perform the positioning calculation (the position converging calculation, in more detail), and in addition thereto, the initial position is used for determining the satellite (hereinafter referred to as a "capturing object satellite") to be a capturing object, and for calculating a geometric distance between the portable phone 2 and the capturing object satellite. Therefore, it is necessary to determine that the initial position is a position as close to the true position of the portable phone 2 as possible.

If the expected position acquired from the base station 3 has accuracy of within ±150 km from the true position of the portable phone 2, it is conceivable that the location of the portable phone 2 is included in a positional range of 300 km square centered on the expected position thus acquired. Therefore, the initial position close to the true position of the portable phone 2 with an error range equal to or smaller than at most 300 km can be obtained.

In further detailed explanations, as shown, for example, in FIG. 2, a two-dimensional predetermined area (thereinafter referred to as a "frame" in the present embodiment) centered on the expected position (indicated by a black circle in the drawing) and with an altitude identical to that of the expected position is ideally disposed on the earth. Then, the candidate positions called a grid are arranged in a reticular pattern with intervals of, for example, 50 km in the frame. It should be noted that although the explanations are presented here assuming that the two-dimensional frame is disposed so that the altitude of the entire grid becomes constant, it is also possible to assume that a three-dimensional frame is disposed so that the altitude of the grid becomes the altitude of the earth's surface of the grid.

Further, with respect to each of the grid points, the distance between the grid point and the capturing object satellite is obtained from the positional coordinates using the following formula (1). The distance between the grid point and the capturing object satellite obtained from the positional coordinates is referred to as a "geometric distance."

$$GR_i = \sqrt{(X_i-x)^2+(Y_i-y)^2+(Z_i-z)^2} \tag{1}$$

It should be noted that "GR" denotes the geometric distance, and the subscript "i" denotes the number of the capturing object satellite. Further, $(X_i, Y_i, Z_i)$ denotes the positional coordinates of the capturing object satellite, and (x, y, z) denotes the positional coordinates of the grid point.

Further, the GPS satellite signal transmitted from the GPS satellite SV is modulated with the PRN code as a type of spread code different between the satellites using a direct spread spectrum method. In this case, the phase (hereinafter referred to as a "code phase") of the PRN code can be detected by performing the correlation process between the replica code generated inside the apparatus and the PRN code. The pseudo distance "PR" between the portable phone 2 and the capturing object satellite can be calculated from the code phase.

Further, with respect to each of the grid points, the position converging calculation is performed assuming the grid point as a provisional initial position and using the difference "δR=PR−GR" between the pseudo distance "PR" and the geometric distance "GR." As the converging calculation, a successive approximation method (Newton-Raphson method), for example, can be used, and the grid point in which the solution converges is determined as the initial position for the positioning calculation.

In the case in which an error range of the expected position provided from the base station 3 is ±150 km or smaller, the initial position can be determined by assuming one frame of 300 km square as described above, and executing the position converging calculation with respect to each of the grid points in the frame. However, in the case in which the error range of the expected position exceeds ±150 km, the location of the portable phone 2 is not necessarily included in the 300 km square frame centered on the expected position thus provided. Therefore, it is necessary to expand the search area of the initial position.

For example, in the case in which the expected position with the error range of ±500 km is provided from the base station 3, as shown in FIG. 3, an area of 1000 km square is formed by setting the frame F1 centered on the expected position (indicated with the black circle in the drawing) thus provided, and further setting eight frames F2 through F9 around the frame F1. Then, the position converging calculation is executed with respect to all of the grid points included in the frames F1 through F9, thereby determining the initial position.

However, in the example shown in FIG. 3, since the 7×7=49 grid points are included in each of the frames, 49×9=441 grid points exist in the nine frames, and if the position converging calculation is executed with respect to all of the grid points, there arises a problem in that the calculation amount becomes enormous. Further, since the search area of the initial position is expanded, a plurality of convergence points by the position converging calculation is observed, and in some cases, it becomes difficult to select the grid point as the initial position.

In order to solve these problems, in the present embodiment, narrowing down the grid points is performed using an a-priori residual APR (hereinafter referred to as an "APR value"). Further, by executing the position converging calculation with respect only to the grid points thus narrowed down, the amount of calculation is reduced, and a situation in which a plurality of convergence points is observed in the position converging calculation is prevented.

Here, the APR value is calculated using the following formula (2).

$$APR = \sum_{i}^{N}(\delta R_i)^2 = \sum_{i}^{N}(PR_i - GR_i)^2 \qquad (2)$$

It should be noted that "N" denotes the number of capturing object satellites. The APR value is obtained as a square sum of the differences between the pseudo distances "PR" and the geometric distances "GR" of the respective capturing object satellites.

FIG. 4 is a view of a diagram for explaining the procedures in determining the initial position and positioning in the present embodiment. The PRN code is a signal with a bit rate of 1.023 Mbps and a bit length of 1,023 bits (=1 msec=300 km). The distance (the geometric distance) between the GPS satellite SV and the grid point can be represented by a length obtained by adding the fractional part to an integral multiple of 300 km, which is a wavelength corresponding to a cycle period 1 ms of the PRN code. For example, in FIG. 4, the geometric distance between the grid point G and the satellite SV can be expressed as "GR=300 km×A+B." Similarly, the pseudo distance between the portable phone 2 and the satellite SV can also be expressed as "PR=300 km×C+D."

In the present embodiment, firstly, the geometric distance "GR" is calculated with respect to each of the grid points (third candidate positions), and the fractional parts (the first distances) thereof are calculated. Further, the fractional part (the second distance) of the pseudo distance "PR" thus observed is calculated. Then, the APR values are calculated using the differences between the fractional part "D" of the pseudo distance "PR" and the fractional parts "B" of the geometric distances "GR," and then N grid points with smaller APR values are selected, thereby narrowing the grid points down to the N grid points (first candidate positions). It should be noted that the number "N" of grid points thus obtained by the narrowing-down here is preferably in a range of "5 through 20." In other words, with respect to each of the grid points, a difference between the fractional part "B" of the geometric distance "GR" and the fractional part "D" of the pseudo distance "PR" is calculated to narrow the grid points down to N (5 through 20) grid points with smaller differences.

Subsequently, the position converging calculations with the number of iterations of m are executed using the N grid points (the first candidate positions) thus obtained by the narrowing-down as the respective candidate initial positions, thereby narrowing the N grid points down to M grid points (the second candidate positions). In this case, the number "m" of iterations of the position converging calculations is preferably in a range of "2 to 3." In about "2 to 3" grid points out of the N grid points, the solution is converged by the m times of the position converging calculations. It is assumed that the number of grid points obtained by narrowing-down here is M. In other words, using the N grid points obtained by narrowing-down as candidate initial distances, the position converging calculation with the number of iterations of m (2 to 3) is executed, thereby narrowing the grid points down to M (2 to 3) grid points.

Then, the APR value is calculated using the geometric distance (a third distance) "GR" and the pseudo distance (a fourth distance) "PR" with respect to each of the M grid points (the second candidate positions) thus obtained by the narrowing-down. Then, the grid point with the smallest APR value thus calculated is selected and determined as the initial position. In other words, with respect to M grid points, APR values are calculated using the geometric distances "GR" and pseudo distance "PR," and the grid point with the minimum value is selected to be determined as the initial position. Subsequently, the position converging calculation with the number of iterations of n is executed using the initial position thus determined, thereby obtaining the positioning location of the portable phone 2. In this case, the number "n" of iterations of the position converging calculations is preferably in a range of "6 through 10." In other words, using the initial position thus determined, the position converging calculation with the number of iterations of n (6 through 10) is executed, thereby obtaining the positioning location of the portable phone 2.

One of significant features of the present embodiment is to narrow firstly the many existing grid points down to 5 through 20 grid points using the fractional parts of the geometric distances and the fractional part of the pseudo distance, and to narrow subsequently the grid points down further to 2 to 3 grid points by executing the position converging calculations with a small number of iterations (small amount of calculation). Thus, it becomes possible to select the grid point to be the initial position with a small amount of calculation without executing the complete position converging calculation with respect to each of the enormous number of grid points.

3. Functional Configuration

Figure 5:
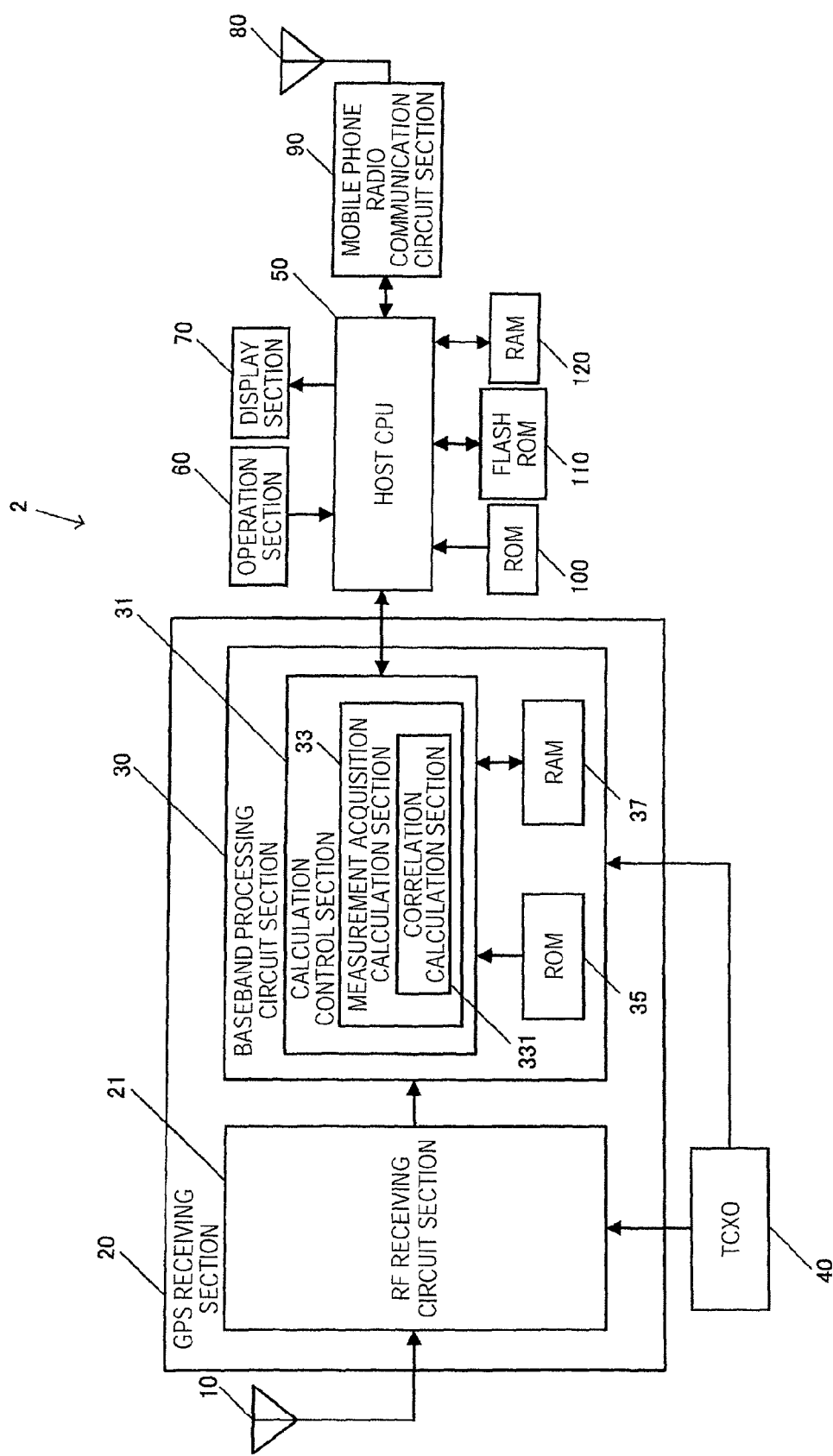
FIG. 5 is a view of a block diagram showing a functional configuration of a portable phone of the positioning system.

FIG. 5 is a view of a block diagram showing a functional configuration of the portable phone 2 in the present embodiment. The portable phone 2 is configured to include a GPS antenna 10, a GPS receiving section 20, a temperature compensated crystal oscillator (TCXO) 40, a host central processing unit (CPU) 50, an operation section 60, a display section 70, a cellular phone antenna 80, a cellular phone radio communication circuit section 90, a read only memory (ROM) 100, a flash ROM 110, and a random access memory (RAM) 120.

The GPS antenna 10 is an antenna that receives radio frequency (RF) signals including the GPS satellite signals transmitted from GPS satellites, and outputs the signals, thus received, to the GPS receiving section 20.

The GPS receiving section 20 is a positioning circuit that positions the present location of the portable phone 2 based on the signal output from the GPS antenna 10, and is a functional block corresponding to a so-called GPS receiver. The GPS receiving section 20 is configured to include a radio frequency (RF) receiving circuit section 21, and a baseband processing circuit section 30. It should be noted that the RF receiving circuit section 21 and the baseband processing circuit section 30 can be manufactured separately as discrete large scale integration circuits (LSI), or manufactured integrally as a single chip.

The RF receiving circuit section 21 is a processing circuit block for RF signals, and for dividing or multiplying the oscillation signal generated by the TCXO 40, thereby generating the oscillation signal for RF signal multiplication. Then, the RF receiving circuit section 21 multiplies the oscillation signal, thus generated, by the RF signal output from the GPS antenna 10, thereby down-converting the RF signal into a signal (hereinafter referred to as an "intermediate frequency (IF) signal") with an intermediate frequency. Then, after amplifying the IF signal, the RF receiving circuit section 21 converts the IF signal into a digital signal with an analog-to-digital (A/D) converter, and then output it to the baseband processing circuit section 30.

The baseband processing circuit section 30 is a circuit section that executes correlation processing and on the like on the IF signal output from the RF receiving circuit section 21 to capture and to extract the GPS satellite signal, and decodes the data to retrieve a navigation message and time information, thereby performing the positioning calculation. The baseband processing circuit section 30 is configured including a calculation control section 31, a ROM 35, and a RAM 37. Further, the calculation control section 31 is configured including a measurement acquisition calculation section 33.

The measurement acquisition calculation section 33 is a circuit section that performs capturing and tracking of the GPS satellite signal based on the received signal (the IF signal) output from the RF receiving circuit section 21, and is configured to include a correlation calculation section 331. The measurement acquisition calculation section 33 acquires the information such as a Doppler frequency or code phase of the GPS satellite signal captured and tracked as an actual measurement value, and outputs it to the host CPU 50.

The correlation calculation section 331 executes the correlation calculation process to calculate the correlation between the PRN code included in the received signal and the replica code using, for example, a fast Fourier transform (FFT) operation, and to integrate the results to capture the GPS satellite signal. The replica code denotes a signal generated spuriously for simulating the PRN code included in the GPS satellite signal to be captured.

If the GPS satellite signal to be captured is correct, the PRN code included in the GPS satellite signal and the replica code match with each other (capture is successful), and if it is wrong, they do not match (capture has failed). Therefore, it is possible to determine whether or not the capture of the GPS satellite signal is successful by judging the peak of the integrated correlation value thus calculated, and by executing correlation calculation with the same reception signal while sequentially changing the replica codes, it becomes possible to capture the GPS satellite signal.

Further, the correlation calculation section 331 executes the correlation calculation process described above while varying the frequency of the generation signal of the replica code and the phase of the replica code. When the frequency of the generation signal of the replica code and the frequency of the received signal match with each other, and at the same time the phase of the replica code and the phase of the PRN code included in the received signal match with each other, the integrated correlation value becomes the maximum.

More specifically, a predetermined range of the frequency and the phase corresponding to the GPS satellite signal as the capturing object is set as a search range. Further, the correlation calculation in a phase direction for detecting the start position (code phase) of the PRN code and the correlation calculation in a frequency direction for detecting the frequency are executed in the search range. The search range is determined in a predetermined frequency scanning range centered on 1.57542 [GHz] as the carrier frequency of the GPS satellite signal regarding the frequency, and in a code phase range of 1023 chips as the chip length of the PRN code regarding the phase.

TCXO 40 is a temperature compensated crystal oscillator for generating the oscillation signal at a predetermined oscillation frequency, and outputs the oscillation signal thus generated to the RF receiving circuit section 21 and the baseband processing circuit section 30.

The host CPU 50 is a processor for integrally controlling each of the sections of the portable phone 2 along various kinds of programs such as a system program stored in the ROM 100. The host CPU 50 makes the display section 70 display an output position obtained by executing the positioning process.

The operation section 60 is an input device composed, for example, of a touch panel and button switches, and outputs the signal corresponding to the key or button, which is held down, to the host CPU 50. By operating the operation section 60, various kinds of instruction inputs, such as a call request or a transmission/receiving request of an electronic mail, are executed.

The display section 70 is a display device composed of a liquid crystal display (LCD) or the like, and executes various kinds of displays based on the display signal input from the host CPU 50. On the display section 70, the navigation screen, the time information, and so on are displayed.

The cellular phone antenna 80 is an antenna for performing transmission and reception of the cellular phone radio communication signal with the wireless base stations installed by the communication service company of the portable phone 2.

The mobile phone radio communication circuit section 90 is a communication circuit section of the mobile phone and is mainly composed of an RF conversion circuit, a baseband processing circuit, and so on. The mobile phone radio communication circuit section 90 executes modulation and demodulation on the mobile phone radio signal, thereby realizing phone calls, transmission and reception of the electronic mails, and so on.

The ROM 100 stores a system program for the host CPU 50 to control the portable phone 2, various programs and data for the host CPU 50 to realize a navigation function, and so on.

The flash ROM 110 is a readable and writable nonvolatile storage device, and similarly to the ROM 100, stores various programs and data for the host CPU 50 to control the portable phone 2. The data stored in the flash ROM 110 are not lost even when the portable phone 2 is powered down.

The RAM 120 forms a work area for temporarily storing the system program, and various types of processing programs executed by the host CPU 50, and in-process data and process results of the various types of processing.

4. Data Configuration

Figure 6:
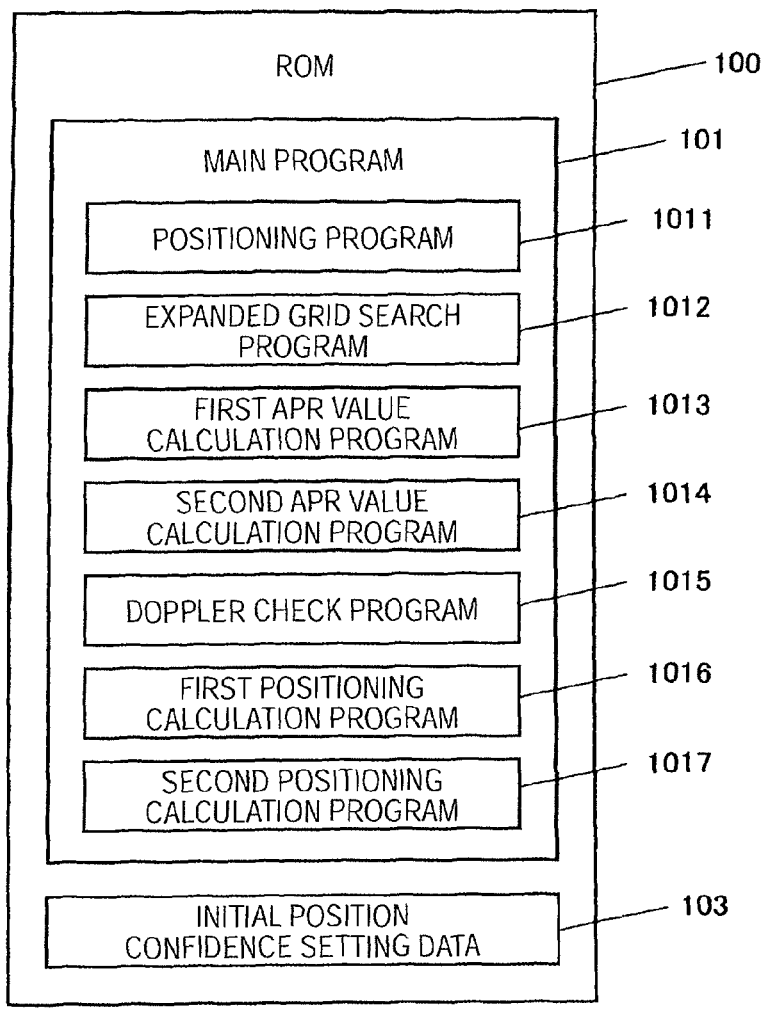
FIG. 6 is a view of a diagram showing an example of data stored in a ROM of the portable phone.

FIG. 6 is a view of a diagram showing an example of the data stored in the ROM 100. The ROM 100 stores the main program 101 retrieved by the host CPU 50 and executed as the main process (see FIG. 13), and initial position confidence setting data 103.

Further, a positioning program 1011 executed as a positioning process (see FIGS. 14 and 15), an expanded grid search program 1012 executed as an expanded grid search process (see FIG. 16), a first APR value calculation program 1013 executed as a first APR value calculation process (see FIG. 17), a second APR value calculation program 1014 executed as a second APR value calculation process (see FIG. 18), a Doppler check program 1015 executed as a Doppler check process (see FIG. 19), a first positioning calculation program 1016 executed as a first positioning calculation process, and a second positioning calculation program 1017 executed as a second positioning calculation process are included in the main program 101 as subroutines. These processes will be explained later in detail using flowcharts.

Figures 8, 9:
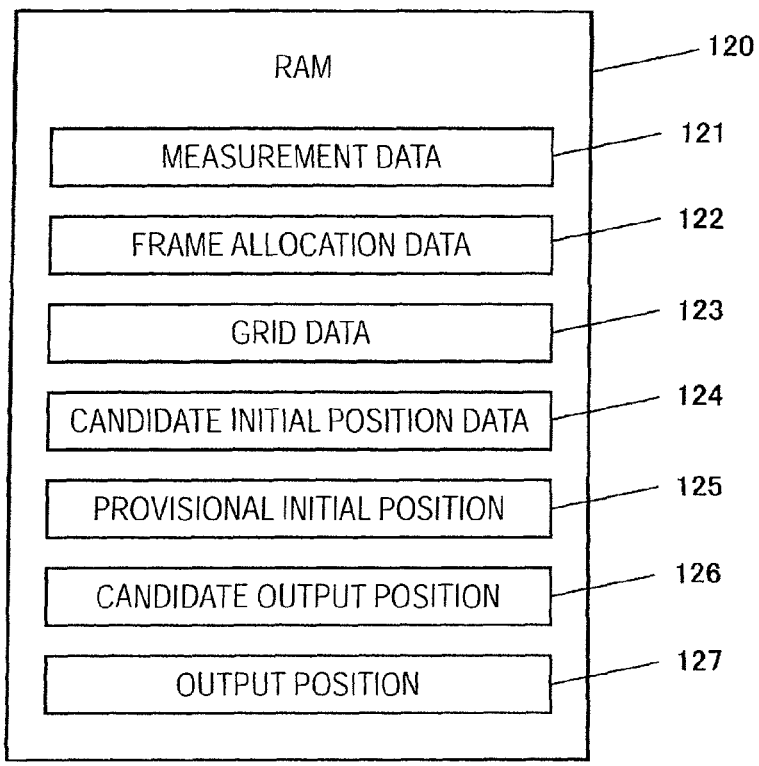
FIG. 8 is a view of a diagram showing an example of data stored in a RAM of the portable phone.
FIG. 9 is a view of a diagram showing an example of a data configuration of initial position confidence setting data stored in the ROM of the portable phone.

FIG. 9 is a view of a diagram showing an example of a data configuration of the initial position confidence setting data 103. As the initial position confidence setting data 103, residual Doppler width 1031 and the initial position confidence 1033 are stored in correspondence with each other. For example, in the case in which the residual Doppler width 1031 is in a range of "20 through 60 Hz," the initial position confidence 1033 is "100 km."

The residual Doppler width 1031 is a width of the differences (hereinafter referred to as "Doppler residuals") between theoretical Doppler frequencies obtained for the respective capturing object satellites using provisional initial positions (hereinafter referred to as "provisional initial positions") and a Doppler frequency calculated by the measurement acquisition calculation section 33. More specifically, the value obtained by subtracting the minimum value of the Doppler residuals obtained for the respective capturing object satellites from the maximum value thereof corresponds to the residual Doppler width 1031.

The initial position confidence 1033 is an index value indicating a degree of the confidence of the initial position 111, and is expressed as the amplitude of the error included in the initial position 111. For example, the initial position confidence 1033 of "100 km" denotes that the initial position 111 includes the error of "100 km."

Figure 7:
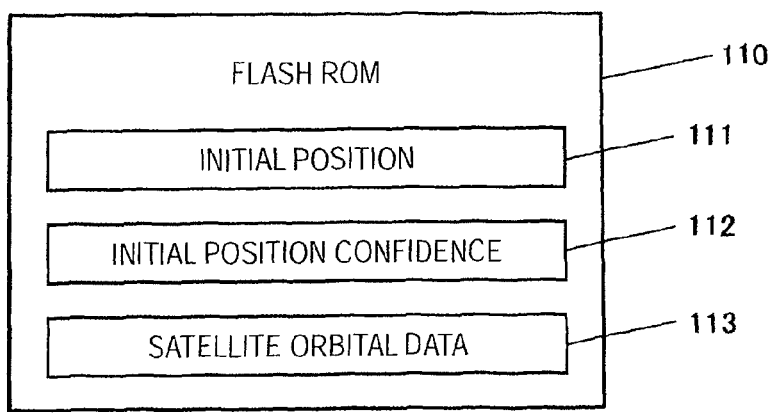
FIG. 7 is a view of a diagram showing an example of data stored in a flash ROM of the portable phone.

FIG. 7 is a view of a diagram showing an example of the data stored in the flash ROM 110. The flash ROM 110 stores an initial position 111, the initial position confidence 112, and satellite orbital data 113.

The initial position 111 is an initial position of the portable phone 2 used in the positioning calculation. In the case of the first positioning or in the case in which more than a predetermined period of time has elapsed from the previous positioning, the host CPU 50 obtains the expected position of the portable phone 2 by performing communication with the base station 3, and makes the flash ROM 110 store the expected position as an update of the initial position 111.

The initial position confidence 112 is an index value indicating the degree of the confidence of the initial position 111, and corresponds to the initial position confidence 1033 shown in FIG. 9. The host CPU 50 obtains the confidence of the expected position from the base station 3, and makes the flash ROM 110 store the confidence as an update of the initial position confidence 112.

The satellite orbital data 113 are data storing satellite orbit of each of the GPS satellites SV, such as almanac or ephemeris. The satellite orbital data 113 can be obtained, for example, by decoding the GPS satellite signal captured by the baseband processing circuit section 30.

FIG. 8 is a view of a diagram showing an example of the data to be stored in the RAM 120. The RAM 120 stores measurement data 121, frame allocation data 122, grid data 123, candidate initial position data 124, a provisional initial position 125, a candidate output position 126, and an output position 127.

FIG. 10 is a diagram showing an example of a data configuration of the measurement data 121. As the measurement data 121, an actual measurement value 1213 composed of the code phase and the Doppler frequency is stored for each of the capturing object satellites 1211. The host CPU 50 acquires the actual measurement values 1213 from the measurement acquisition calculation section 33, and stores them as the measurement data 121 so as to correspond respectively to the capturing object satellites 1211.

The frame allocation data 122 are data related to the allocation of the frames such as frames F1 through F9 shown in FIG. 3, and includes the coordinate values of the frames, for example.

FIG. 11 is a view of a diagram showing an example of a data configuration of the grid data 123. The grid data 123 are data related to all of the grid points of all of the frames, and frame numbers 1231, numbers 1233 of the grid points included in the respective frames, positional coordinates 1235 of the respective grid points, and the first APR values 1237 calculated for the respective grid points are stored as the grid data 123 so as to correspond to each other.

FIG. 12 is a diagram showing an example of a data configuration of the candidate initial position data 124. The candidate initial position data 124 are data related to the grid points selected as the candidate initial positions, and the frame numbers 1241, the grid point numbers 1243, the positional coordinates 1245 of the corresponding grid points, and the second APR values 1247 are stored as the candidate initial position data 124 so as to correspond to each other.

The provisional initial position 125 is a position corresponding to the grid point determined as the provisional initial position out of the candidate initial positions. The candidate output position 126 is a position obtained by the second positioning calculation process as the candidate of the output position. Further, the output position 127 is a position determined as the position to be finally output to the display section 70.

5. Flow of Processes

Figure 13:
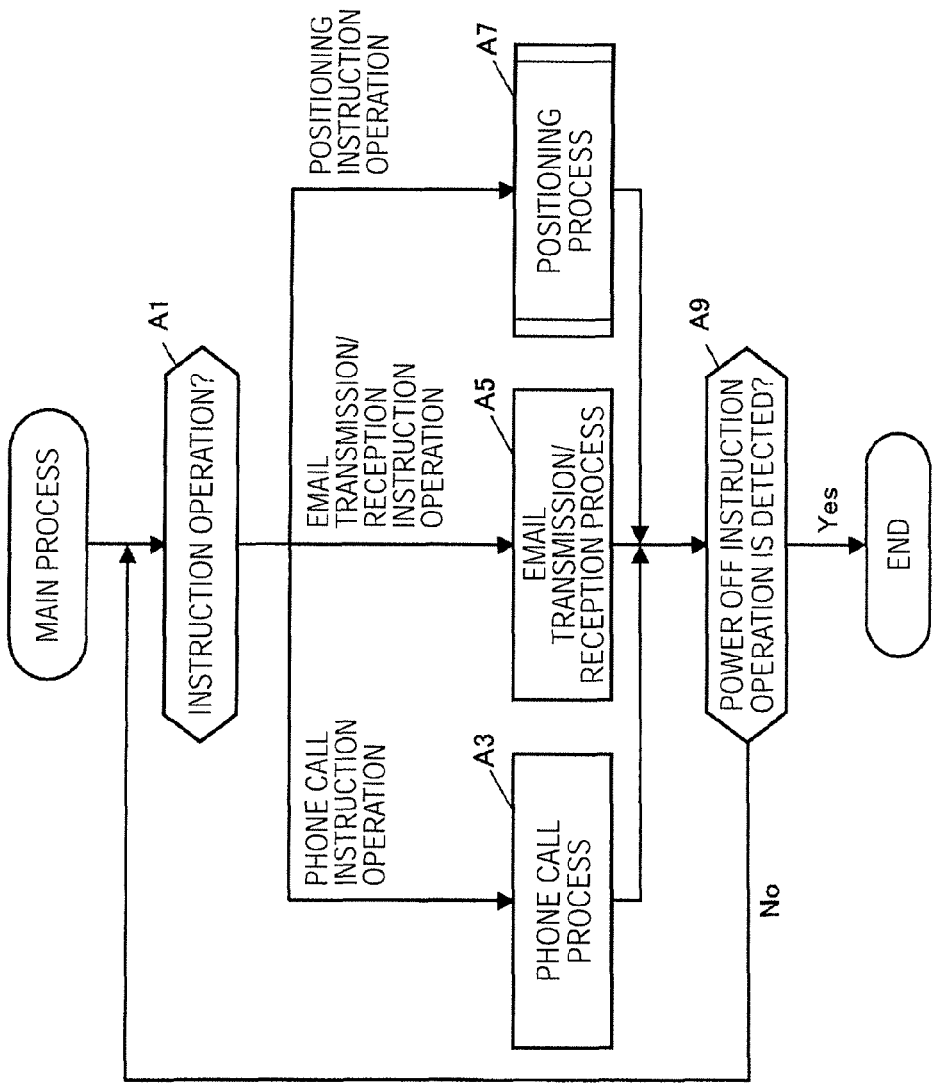
FIG. 13 is a view of a flowchart showing the flow of a main process of the positioning system.

FIG. 13 is a flowchart showing the flow of the main process executed in the portable phone 2 by the host CPU 50 retrieving and executing the main program 101 stored in the ROM 100.

Referring to FIGS. 5 and 13, the main process is started when the host CPU 50 detects that the user executes a power-on operation via the operation section 60. Further, although not specifically explained, it is assumed that while the main process described below is in progress, a state is created. In this state, reception of the RF signal by the GPS antenna 10 and the down-conversion of the RF signal by the RF receiving circuit section 21 into the IF signal are executed. Further, capturing and extraction of the GPS satellite signals from the IF signal by the baseband processing circuit section 30 and the calculation of the actual measurement value by the measurement acquisition calculation section 33 are executed as needed.

Firstly, the host CPU 50 discriminates (step A1) the instruction operation executed via the operation section 60, and if it is determined that the instruction operation is a phone call instruction operation (a phone call instruction operation in the step A1), the host CPU 50 executes (step A3) the phone call process. Specifically, the host CPU 50 makes the cellular phone radio communication circuit section 90 perform the base station communication with the base station 3, thereby realizing a phone call between the portable phone 2 and another device.

Further, if it is determined in the step A1 that the instruction operation is an electronic mail transmission/reception instruction operation (an electronic mail transmission/reception instruction operation in the step A1), the host CPU 50 executes an electronic mail transmission/reception process (step A5). Specifically, the host CPU 50 makes the cellular phone radio communication circuit section 90 perform the base station communication, thereby realizing the transmission/reception of the electronic mail between the portable phone 2 and another device.

Further, referring now to FIGS. 5, 6, and 13, if it is determined in the step A1 that the instruction operation is a positioning instruction operation (a positioning instruction operation in the step A1), the host CPU 50 retrieves and executes the positioning program 1011 stored in the ROM 100, thereby executing the positioning process (step A7).

Figure 14:
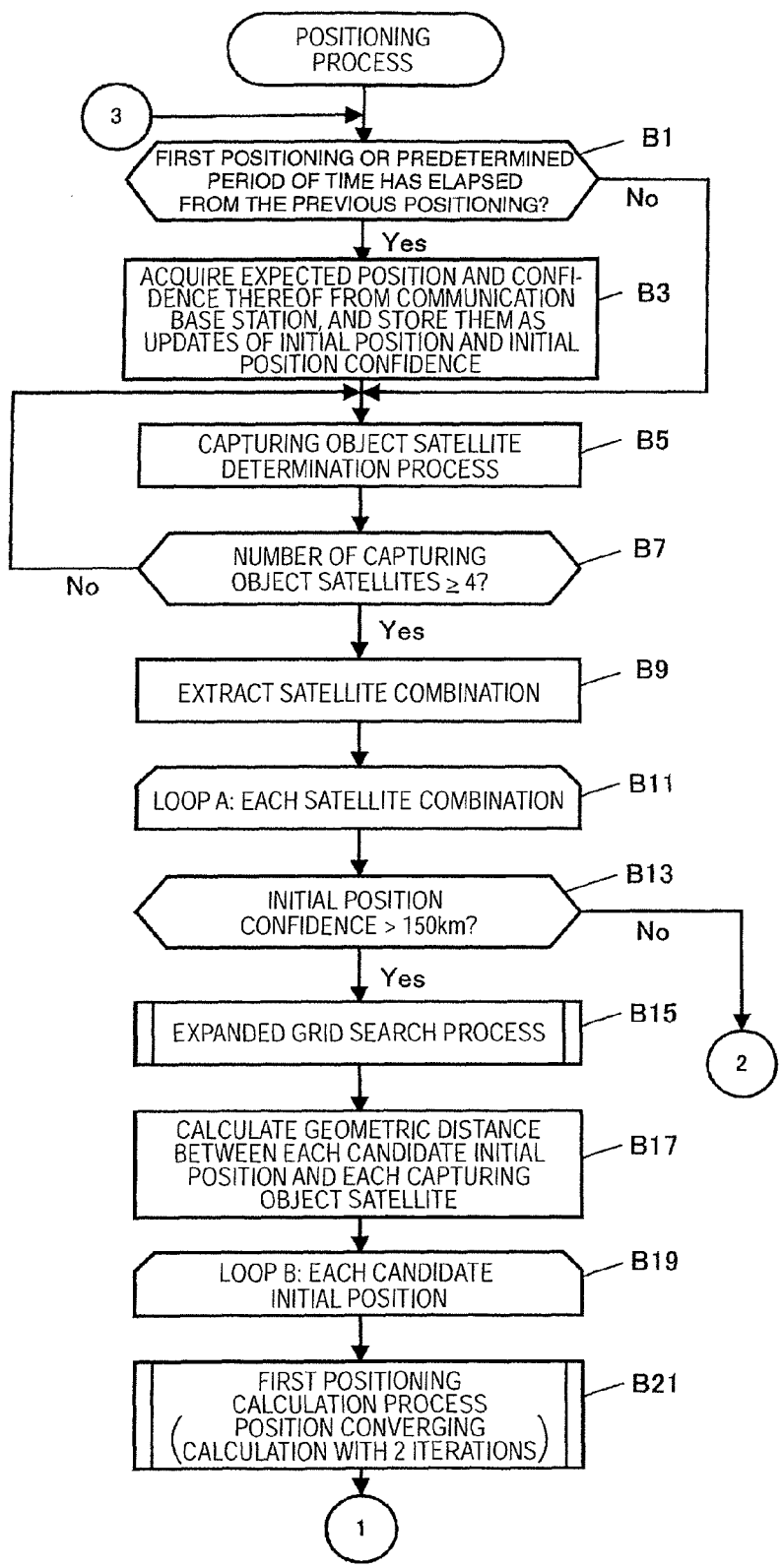
FIG. 14 is a view of a flowchart showing the flow of a positioning process of the main process.
Figure 15:
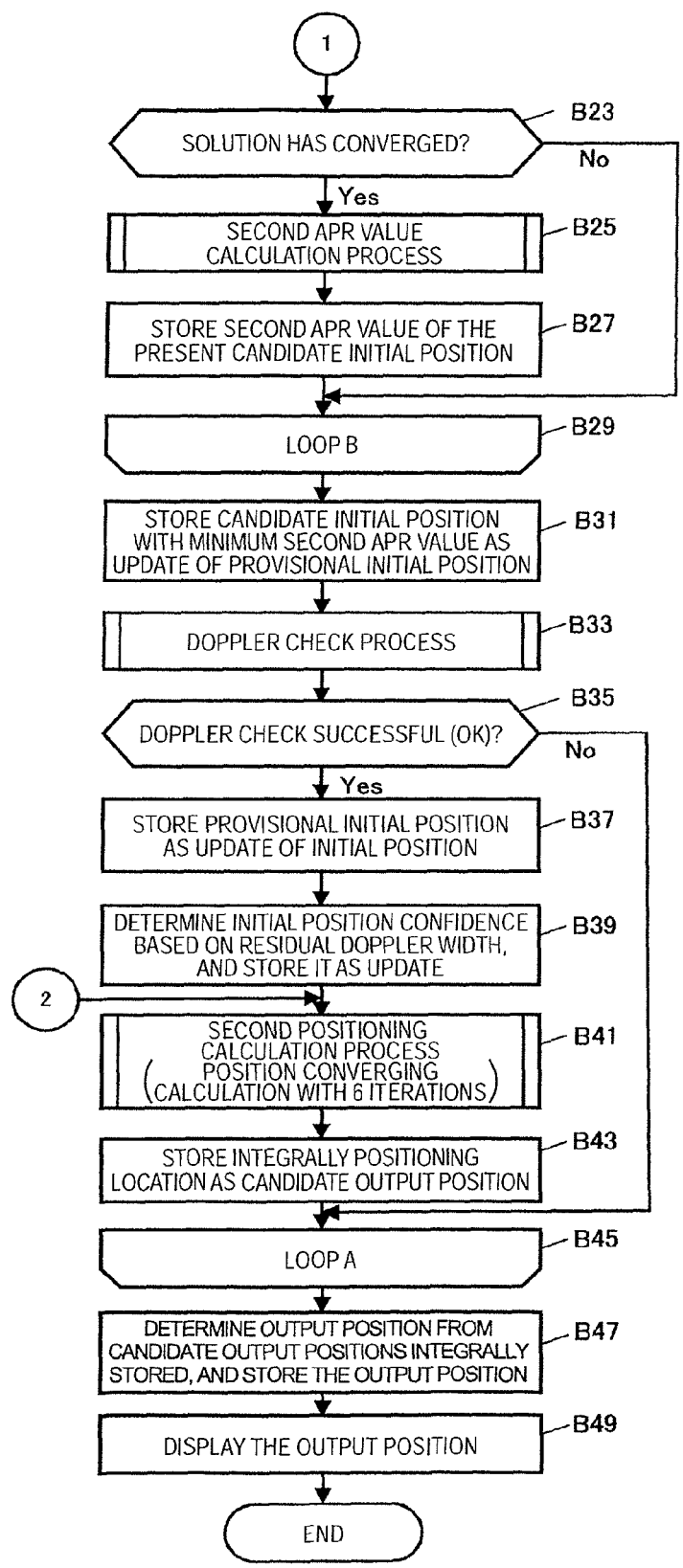
FIG. 15 is a view of a flowchart further showing the flow of the positioning process.

FIGS. 14 and 15 are views of flowcharts showing the flow of the positioning process.

Firstly, the host CPU 50 determines (step B1) whether or not it is the first positioning or a predetermined period of time has elapsed from the previous positioning, and if it is determined that this condition is not satisfied (No in the step B1), the host CPU 50 makes the process proceed to the step B5. Further, referring to FIGS. 7 and 14, if it is determined that the condition is satisfied (Yes in the step B1), the host CPU 50 acquires the expected position of the portable phone and the confidence of the expected position from the communication base station, and makes the flash ROM 110 store them as updates of the initial position 111 and the initial position confidence 112.

Subsequently, the host CPU 50 executes a capturing object satellite determination process using the initial position 111 and the satellite orbital data 113 stored in the flash ROM 110 (step B5). More specifically, referring to FIGS. 5 and 14 the host CPU 50 determines the GPS satellites SV located in the sky of the initial position 111 at the current time measured in a timepiece section, not shown, based on the satellite orbital data 113 as the capturing object satellites.

Subsequently, the host CPU 50 determines whether or not the number of capturing object satellites is equal to or larger than four (step B7), and if it is determined that it is smaller than four (No in the step B7), the host CPU 50 returns the process to the step B5.

Further, if it is determined that the number is equal to or larger than four (Yes in the step B7), the host CPU 50 extracts the combination (hereinafter referred to as a "satellite combination") of the capturing object satellites (step B9). For example, in the case in which the number of capturing object satellites is six, combinations ($_6C_4=15$) with four satellites, combinations ($_6C_5=6$) with five satellites, combinations ($_6C_6=1$) with six satellites, total 22 satellite combinations are extracted.

Subsequently, referring now to FIGS. 5, 7, 14, and 15, the host CPU 50 executes the process of the loop A (steps B11 through B45) with respect to each of the satellite combinations thus extracted in the step B9. In the loop A, the host CPU 50 determines whether or not the initial position confidence 112 stored in the flash ROM 110 exceeds 150 km (step B13), and if it is determined to be equal to or smaller than 150 km (No in the step B13), the host CPU 50 makes the process proceed to the step B41.

Further, referring to FIGS. 5, 6, and 14, if it is determined that the initial position confidence 112 exceeds 150 km (Yes in the step B13), the host CPU 50 retrieves and executes the expanded grid search program 1012 stored in the ROM 100, thereby executing the expanded grid search process (step B15).

Figure 16:
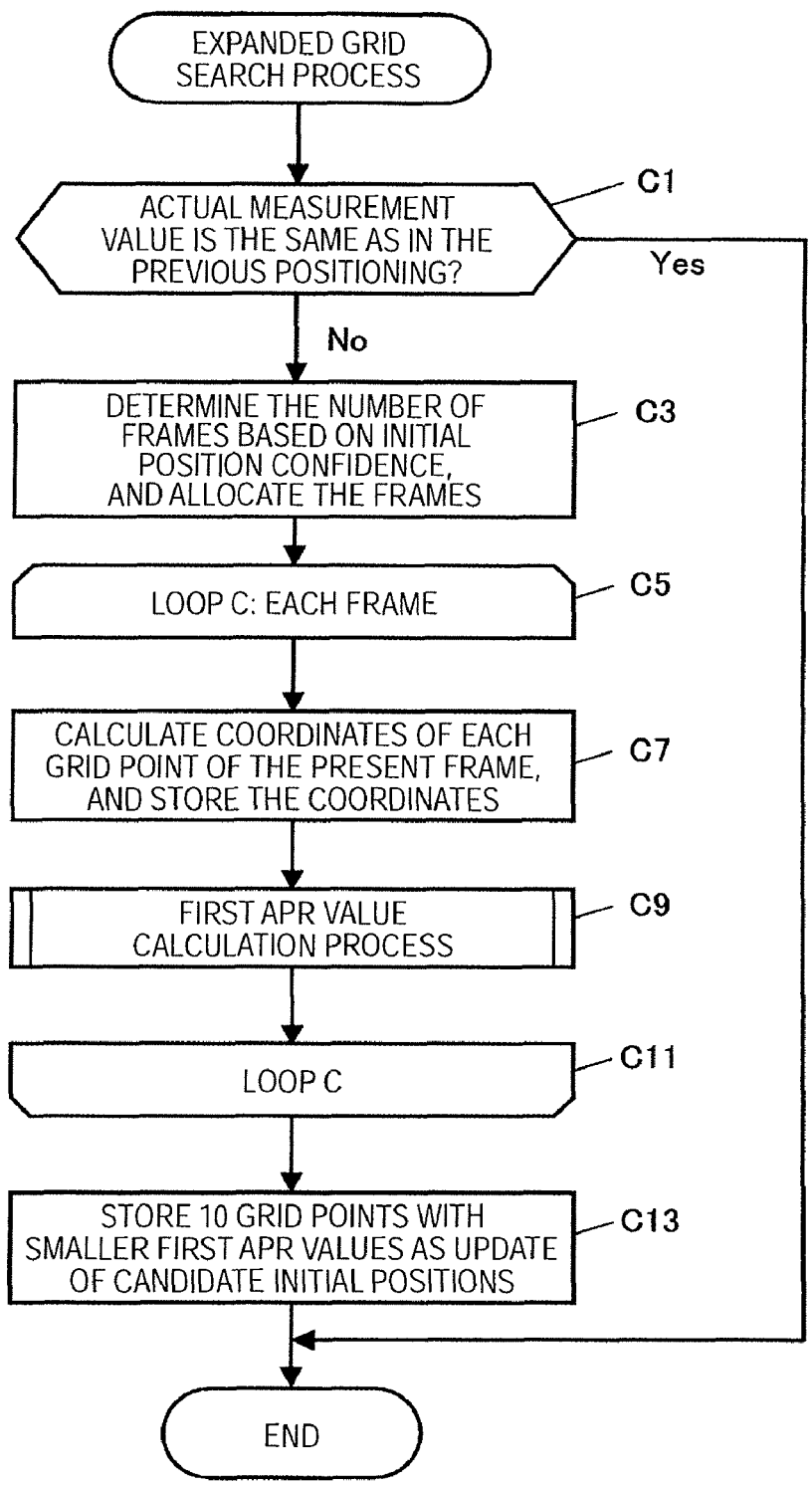
FIG. 16 is a view of a flowchart showing the flow of an expanded grid search process of the positioning process.

FIG. 16 is a flowchart showing the flow of the expanded grid search process.

Firstly, referring to FIGS. 5, 7, and 16, the host CPU 50 determines whether or not the actual measurement value calculated by the measurement acquisition calculation section 33 is the same as in the previous positioning (step C1), and if it is determined that they are not the same (No in the step C1), the host CPU 50 determines the number of frames based on the initial position confidence 112 stored in the flash ROM 110, and ideally allocates the frames on the earth (step C3).

More specifically, the host CPU 50 allocates a corresponding number of frames to the initial position confidence 112 setting the initial position 111 stored in the flash ROM 110 to be the center grid point. For example, in the case in which the initial position confidence 112 is in a range of "600 km through 1000 km," as shown in FIG. 3, the host CPU 50 allocates the frame F1 centered on the initial position 111 at the center, and then allocates the eight frames F2 through F9 around the frame F1. Further, in the case in which it is in a range of "300 km through 600 km," the host CPU 50 allocates 2 by 2 total 4 frames, and in the case in which it is in a range of "1,000 km through 1,300 km," the host CPU 50 allocates 4 by 4 total 16 frames. In the same manner, the number of frames to be allocated is increased every 300 km increase in the range.

Subsequently, referring now to FIGS. 5, 11, and 16, the host CPU 50 executes the process of the loop C (steps C5 through C11) with respect to each of the frames thus allocated in the step C3. In the loop C, the host CPU 50 calculates the positional coordinates 1235 of all of the grid points of the corresponding frame, and stores them in the RAM 120 in conjunction with the number 1231 of the frame and the numbers 1233 of the grid points as the grid data 123 (step C7).

Subsequently, referring to FIGS. 5, 6, and 16, the host CPU 50 retrieves and executes the first APR value calculation program 1013 stored in the ROM 100, thereby executing the first APR value calculation process (step C9).

Figure 17:
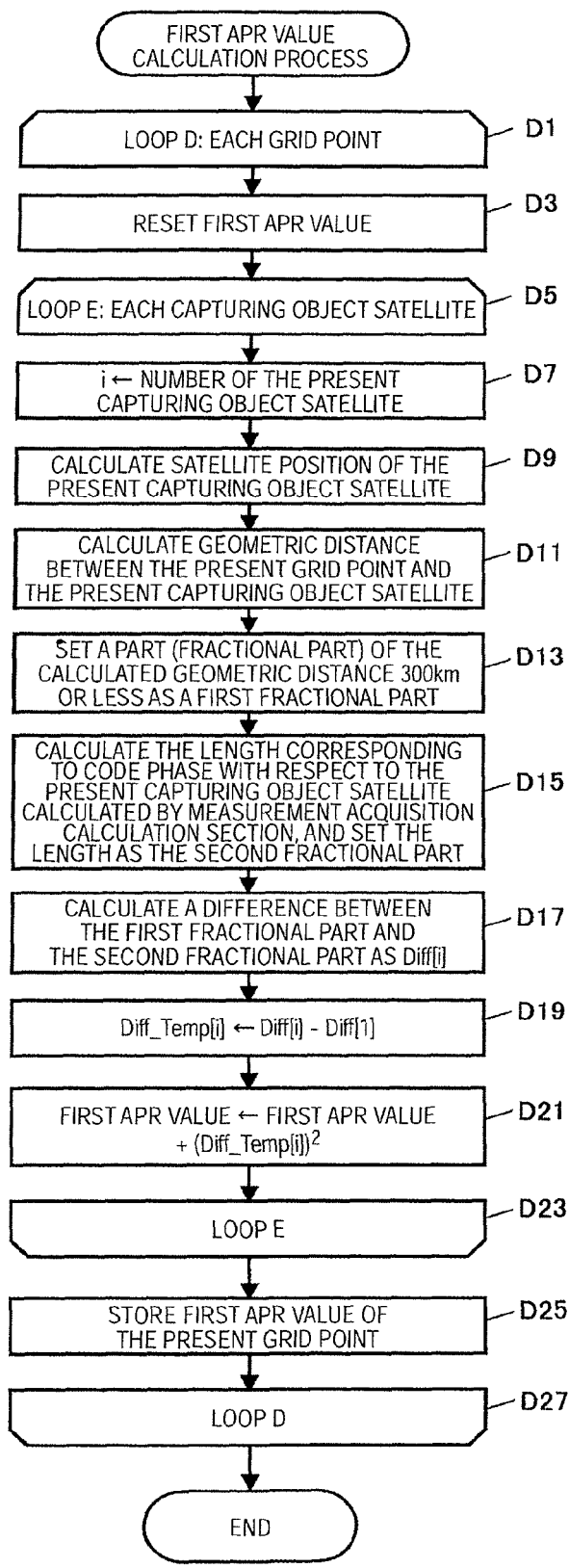
FIG. 17 is a view of a flowchart showing the flow of a first APR value calculation process of the expanded grid search process.

FIG. 17 is a flowchart showing the flow of the first APR value calculation process.

Referring to FIGS. 5, 11, and 17, firstly the host CPU 50 executes a process corresponding to the loop D with respect to each of the grid points of the present frame (steps D1 through D27). In the loop D, the host CPU 50 resets the first APR value 1237 of the grid point stored in the RAM 120 as the grid data 123 (step D3).

Subsequently, the host CPU 50 executes the process corresponding to the loop E (steps D5 through D23) for each of the capturing object satellites. In the loop E, the host CPU 50 substitutes the number of the capturing object satellite for "i" (step D7). Then, the host CPU 50 calculates the positional coordinates of the capturing object satellite based on the satellite orbital data 113 stored in the flash ROM 110 (step D9).

Subsequently, the host CPU 50 calculates the geometric distance "GR" between the present grid point and the present capturing object satellite based on the positional coordinates 1235 of the present grid point stored as the grid data 123 and the positional coordinates of the present capturing object satellite calculated in the step D9 (step D11).

Subsequently, the host CPU 50 calculates a part (a fractional part) of the geometric distance "GR" thus calculated, which is 300 km or smaller, as a first fractional part (step D13). Further, the host CPU 50 calculates the length, which corresponds to the code phase with respect to the present capturing object satellite calculated by the measurement acquisition calculation section 33, as a second fractional part (step D15).

Subsequently, the host CPU 50 calculates the difference between the first fractional part calculated in the step D13 and the second fractional part calculated in the step D15 as Diff[i] (step D17). Then, the host CPU 50 subtracts Diff[1] calculated with respect to the first capturing object satellite from Diff[i] thus calculated with respect to the present capturing object satellite as Diff_Temp[i] (step D19).

Subsequently, the host CPU 50 adds the square of Diff_Temp[i] thus calculated in the step D19 to the present first APR value to update the first APR value 1237 (step D21). Then, the host CPU 50 transfers the process to the next capturing object satellite.

After executing the process corresponding to the steps D7 through D21 with respect to all of the capturing object satellites, the host CPU 50 terminates (step D23) the process of the loop E. After terminating the process of the loop E, the host CPU 50 stores the first APR value 1237 of the present grid point in the RAM 120 as the grid data 123 (step D25), and transfers the process to the next grid point.

After executing the process corresponding to the steps D3 through D25 with respect to all of the grid points, the host CPU 50 terminates (step D27) the process of the loop D. Then, the host CPU 50 terminates the first APR value calculation process.

Going back to the expanded grid search process shown in FIGS. 5, 11, and 16, after executing the first APR value calculation process, the host CPU 50 transfers the process to the next frame. After executing the process corresponding to the steps C7 through C9 with respect to all of the frames, the host CPU 50 terminates (step C11) the process of the loop C.

After terminating the process of the loop C, the host CPU 50 extracts "10" grid points with the smaller first APR values, which are stored as the grid data 123 in the RAM 120, as the candidate initial positions, and then stores them in the RAM 120 as an update of the candidate initial position data 124 (step C13). Then, the host CPU 50 terminates the expanded grid search process.

Meanwhile, if the actual measurement value is the same as in the previous positioning in the step C1 (Yes in the step C1), the host CPU 50 terminates the expanded grid search process. This is because, if the actual measurement value is the same as in the previous positioning, the candidate initial positions are also the same in the previous positioning, and therefore, the execution of the process of the steps C3 through C13 is unnecessary.

Going back to the positioning process shown in FIGS. 5, 6, 14, and 15, after executing the expanded grid search process, the host CPU 50 calculates the geometric distance between each of the candidate initial positions and respective one of the capturing object satellites (step B17). Subsequently, the host CPU 50 executes the process corresponding to the loop B (steps B19 through B29) with respect to each of the candidate initial positions.

In the loop B, the host CPU 50 retrieves and executes the first positioning calculation program 1016 stored in the ROM 100, thereby executing the first positioning calculation process (step B21). Specifically, the host CPU 50 executes the position converging calculation based on a least-square method using the geometric distances calculated in the step B17 and the pseudo distance calculated from the code phase. In this case, the number of iterations of the converging calculation is set to be "2."

Subsequently, the host CPU 50 determines (step B23) whether or not the solution has converged, and if it is determined that the solution has not converged (No in the step B23), the host CPU 50 transfers the process to the next candidate initial position. Further, if it is determined that the solution has converged (Yes in the step B23), the host CPU 50 retrieves and executes the second APR value calculation program 1014 stored in the ROM 100, thereby executing the second APR value calculation process (step B25).

Figure 18:
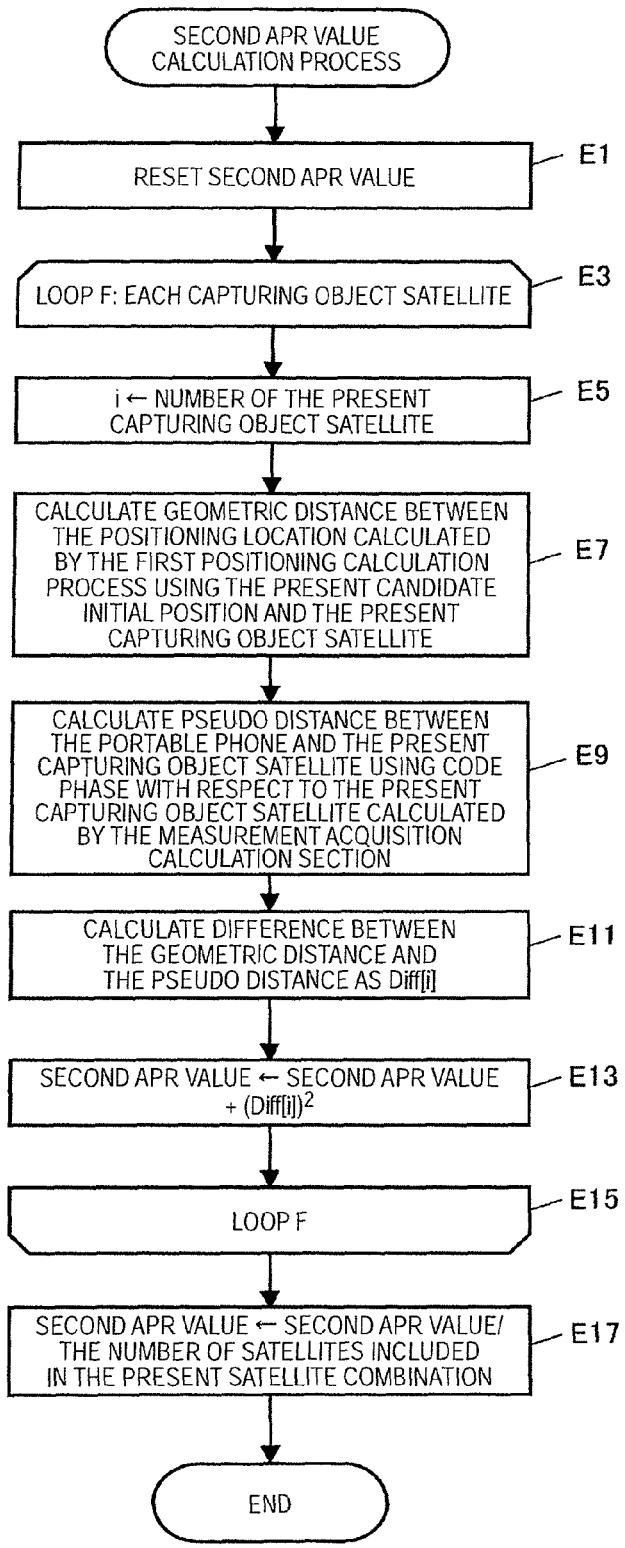
FIG. 18 is a view of a flowchart showing the flow of a second APR value calculation process of the positioning process.

FIG. 18 is a view of a flowchart showing the flow of the second APR value calculation process.

Firstly, referring to FIGS. 5, 12, and 18, the host CPU 50 resets the second APR value 1247 of the present candidate initial position stored in the RAM 120 as the candidate initial position data 124 (step E1). Subsequently, the CPU 50 executes the process corresponding to the loop F (steps E3 through E15) with respect to each of the capturing object satellites.

In the loop F, the host CPU 50 substitutes the number of the present capturing object satellite for "i" (step E5). Then, the host CPU 50 calculates the geometric distance between the positioning location calculated by the first positioning calculation process using the present candidate initial position and the present capturing object satellite (step E7). Further, the host CPU 50 calculates the pseudo distance between the portable phone 2 and the present capturing object satellite using the code phase with respect to the present capturing object satellite calculated by the measurement acquisition calculation section 33 (step E9).

Subsequently, the host CPU 50 calculates the difference between the geometric distance calculated in the step E7 and the pseudo distance calculated in the step E9 as Diff[i] (step E11). Then, the host CPU 50 adds the square of Diff[i] thus calculated to the present second APR value to update the second APR value (step E13). Then, the host CPU transfers the process to the next capturing object satellite.

After executing the process corresponding to the steps E5 through E13 with respect to all of the capturing object satellites, the host CPU 50 terminates (step E15) the process of the loop F. After terminating the process of the loop F, the host CPU 50 divides the second APR value 1247 of the present candidate initial position by the number of satellites included in the present satellite combination to update the second APR value 1247 (step E17). Then, the host CPU 50 terminates the second APR value calculation process.

Going back to the positioning process shown in FIGS. 5, 6, 12, and 15, after executing the second APR calculation process, the host CPU 50 stores the second APR value 1247 of the present candidate initial position in the RAM 120 as the candidate initial position data 124 (step B27). Then, the host CPU 50 transfers the process to the next candidate initial position.

After executing the process corresponding to the steps B21 through B27 with respect to all of the candidate initial positions, the host CPU 50 terminates (step B29) the process of the loop B. After terminating the process of the loop B, the host CPU 50 selects the candidate initial position with the minimum second APR value 1247, which is stored in the RAM 120 as the candidate initial position data 124, as the provisional initial position 125, and stores it in the RAM 120 as an update (step B31).

Subsequently, the host CPU 50 retrieves and executes the Doppler check program 1015 stored in the ROM 100, thereby executing the Doppler check process to determine whether or not the provisional initial position 125 is appropriate (step B33).

Figure 19:
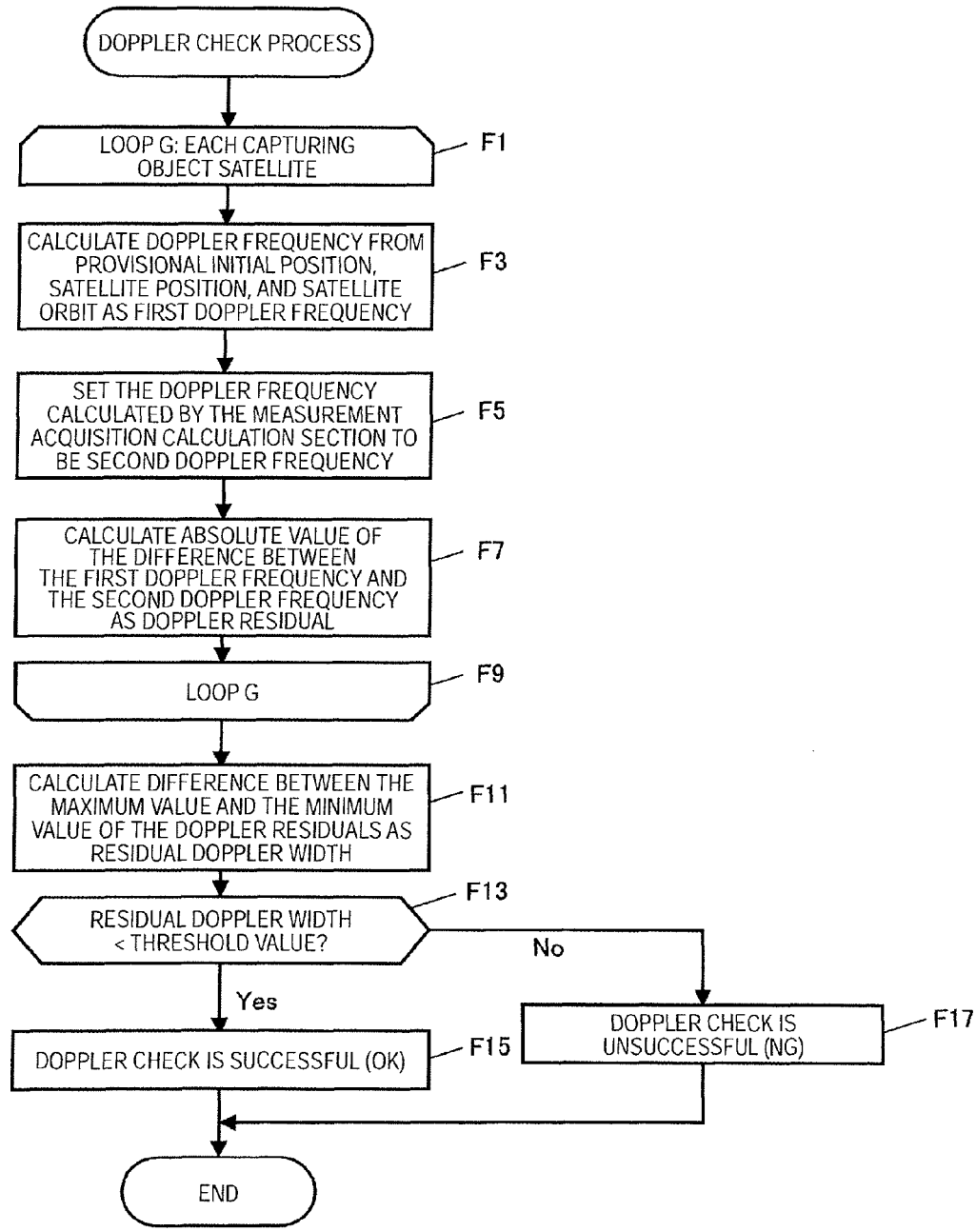
FIG. 19 is a view of a flowchart showing the flow of a Doppler check process of the positioning process.

FIG. 19 is a view of a flowchart showing the flow of the Doppler check process.

Firstly, referring to FIGS. 5, 7, 8, and 19, the host CPU 50 executes the process corresponding to the loop G (steps F1 through F9) with respect to each of the capturing object satellites. In the loop G, the host CPU 50 calculates the Doppler frequency from the provisional initial position 125 stored in the RAM 120, a satellite position of the present capturing object satellite, and the satellite orbital data 113, which is stored in the flash ROM 110, as a first Doppler frequency (step F3).

Further, the host CPU 50 sets the Doppler frequency calculated by the measurement acquisition calculation section 33 as a second Doppler frequency (step F5). Subsequently, the host CPU 50 calculates the absolute value of the difference between the first Doppler frequency and the second Doppler frequency as the Doppler residual (step F7). Then, the host CPU 50 transfers the process to the next capturing object satellite.

After executing the process corresponding to the steps F3 through F7 with respect to all of the capturing object satellites, the host CPU 50 terminates (step F9) the process of the loop G. After terminating the process of the loop G, the host CPU 50 calculates the difference between the maximum value and the minimum value of the Doppler residual as the residual Doppler width (step F11).

Subsequently, the host CPU 50 determines (step F13) whether or not the residual Doppler width is smaller than a predetermined threshold value, and if it is determined to be smaller than the threshold value (Yes in the step F13), the host CPU 50 determines that the Doppler check is successful (OK) (step F15). Further, if it is determined to be equal to or larger than the threshold value (No in the step F13), the host CPU 50 determines that the Doppler check is unsuccessful (NG) (step F17). Then, the host CPU 50 terminates the Doppler check process.

Going back to the positioning process shown in FIGS. 5, 7, 8, and 15, after executing the Doppler check process, the host CPU 50 determines whether or not the Doppler check has been successful (OK) (step B35), and if it is determined that the Doppler check has been unsuccessful (NG) (No in the step B35), the host CPU 50 transfers the process to the next satellite combination.

Further, if it is determined that the Doppler check has been successful (OK) (Yes in the step B35), the host CPU 50 stores the provisional initial position 125, which is stored in the RAM 120, in the flash ROM 110 as an update of the initial position 111 (step B37).

Then, referring to FIGS. 5, 7, 9, and 15, the host CPU 50 looks up the initial position confidence setting data 103 stored in the ROM 100, retrieves the initial position confidence 1033 corresponding to the residual Doppler width 1031 calculated in the step F11, and stores it in the flash ROM 110 as an update of the initial position confidence 112 (step B39).

Subsequently, referring to FIGS. 5, 6, 8, and 15, the host CPU 50 retrieves and executes the second positioning calculation program 1017 stored in the ROM 100, thereby executing the second positioning calculation process (step B41). Specifically, the host CPU 50 executes the position converging calculation based on a least-square method using the geometric distances between the initial position 111 stored in the flash ROM 110 and the capturing object satellites and the pseudo distance calculated from the code phase. In this case, the number of iterations of the converging calculation is set to be "6."

Then, the host CPU 50 integrally stores the positioning location, which is obtained by the second positioning calculation process, in the RAM 120 as the candidate output position 126 (step B43), and transfers the process to the next satellite combination. After executing the process corresponding to the steps B13 through B43 with respect to all of the satellite combinations, the host CPU 50 terminates (step B45) the process of the loop A.

After terminating the process of the loop A, the host CPU 50 determines the output position 127 out of the candidate output positions 126 integrally stored in the RAM 120, and stores it in the RAM 120 (step B47). Specifically, as the output position 127, it is possible to determine, for example, the candidate output position 126 with the maximum average value of the intensity of the signals from the capturing object satellites, or the candidate output position 126 with the minimum position-dilution-of-precision (PDOP) value as an index value of the sky arrangement of the capturing object satellites.

Then, after making the display section 70 display the navigation screen obtained by plotting the output position 127 determined in the step B47 (step B49), the host CPU 50 terminates the positioning process.

Returning to the main process shown in FIG. 13 and referring also to FIG. 5, after executing either one of the processes of the steps A3, A5, and A7, the host CPU 50 determines (step A9) whether or not a power off instruction operation has been made by the user via the operation section 60, and if it is determined that the power off instruction operation has not been made (No in the step A9), the host CPU returns the process to the step A1. Further, if it is determined that the power off instruction operation has been made (Yes in the step A9), the host CPU 50 terminates the main process.

6. Experimental Results

Figure 20:
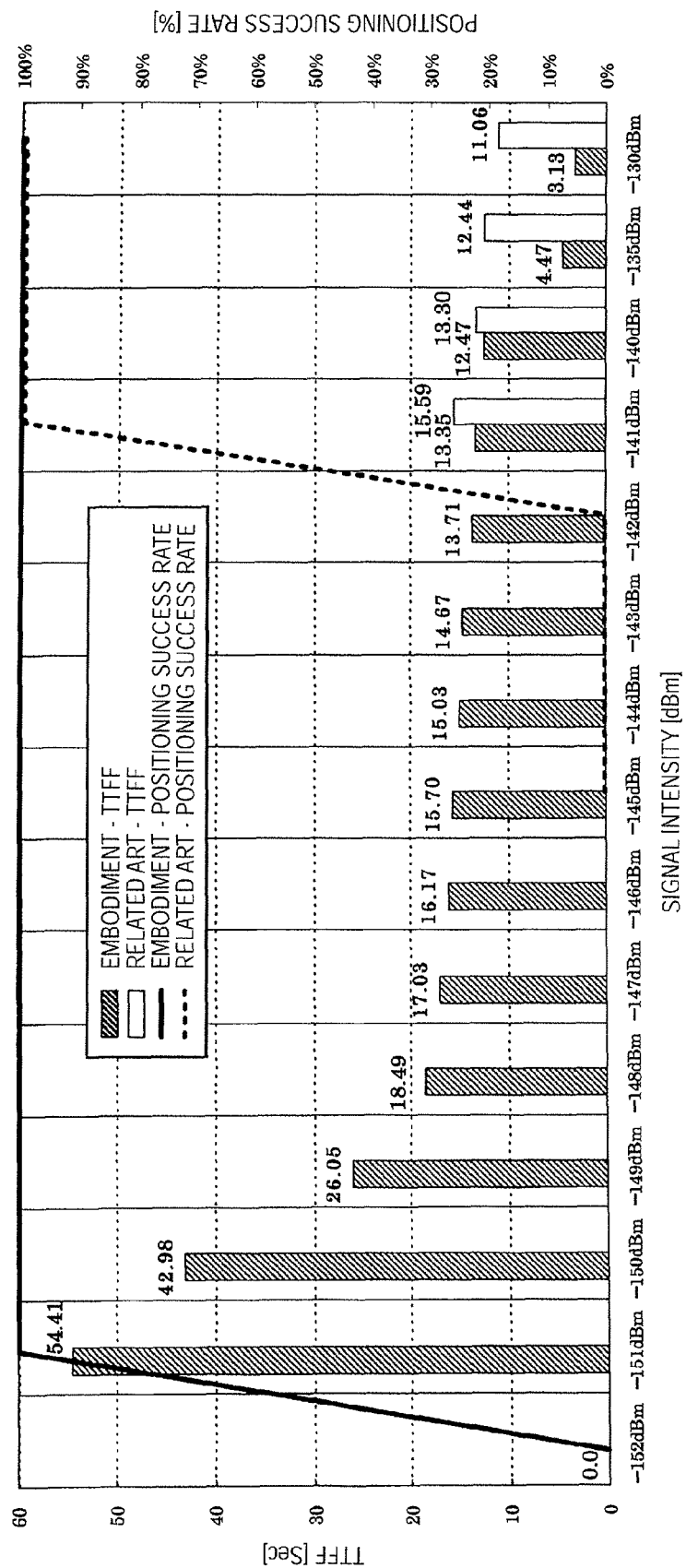
FIG. 20 is a view of a diagram showing an example of an experimental result of the positioning process.

FIG. 20 is a diagram showing an example of the experimental results in the case of measuring the time to first fix (TTFF) and the positioning success rate with respect to each of the method of the related art and the method of the present embodiment. In FIG. 20, the lateral axis represents the signal intensity (dBm) of the GPS satellite signal, and the vertical axes represent TTFF (second) and positioning success rate (%), respectively. The positioning success rate denotes the number of times of success in positioning to the number of trials of the positioning calculation. Since the positioning calculation is a converging calculation, the positioning is determined to be successful in the cases in which the converging is successful or the position thus obtained is within an error range from the true position, which can be deemed successful.

When considering the positioning success rate, it can be understood that although in the related art method the positioning success rate is "100%" with the signal intensity equal to or higher than "−141 dBm," the positioning success rate becomes "0%" when the signal intensity becomes lower than "−141 dBm." In contrast, according to the method of the present embodiment, the positioning success rate is kept "100%" until the signal intensity becomes equal to or lower than "−151 dBm." This shows that according to the method of the present embodiment, it is possible to perform positioning even in an environment (a weak electric field environment) in which the received signal becomes a weak electric field signal.

Then, when considering the TTFF, according to the method of the present embodiment, the TTFF becomes shorter in comparison with the method of the related art. Further, the TTFF does not exceed 20 seconds until the signal intensity becomes equal to or lower than "−148 dBm," which shows that the first fix can be achieved with a relatively short period of time even in the weak electric field environment.

7. Functions and Advantages

According to the present embodiment, a frame, which is a positional range expected to include the location of the portable phone 2 and has a size of at least 300 km square, is set on the earth, and a plurality of grid points (the third candidate positions) is disposed in the frame in a reticular pattern. Further, the difference between the fractional part (a first distance) of the geometric distance from the GPS satellite and the fractional part (a second distance) of the pseudo distance calculated based on the GPS satellite signal is calculated as a first APR value with respect to each of the grid points, and N grid points (first candidate positions) with the smaller first APR values are selected among the plurality of grid points.

Subsequently, the position converging calculation based on the GPS satellite signal using each of the N grid points (the first candidate positions) thus selected as a provisional initial position, thereby further selecting M (<N) grid points (second candidate positions) among the N grid points. Then, with respect to each of the M grid points (the second candidate positions) thus selected, the difference between the geometric distance (a third distance) from the GPS satellite and the pseudo distance (a fourth distance) calculated based on the GPS satellite signal is calculated as a second APR value, and the grid point with the minimum second APR value is selected and determined among the M grid points as the initial position to be used in the positioning calculation.

If the difference between the distance calculated from the physical positional relationship between the grid point and the capturing object satellites and the pseudo distance calculated based on the GPS satellite signal is small, the grid point has a high probability of being located close to the location of the portable phone 2. Therefore, by selecting the N grid points with the smaller differences in distance, it becomes possible to narrow down effectively the grid points in an anterior stage of the position converging calculation. Further, according to the above process, since it becomes unnecessary to execute the position converging calculation on each of the grid points, the amount of calculation can significantly be reduced.

Further, by determining whether or not the solutions converge, which are the results of executing the position converging calculations on the N grid points thus obtained by narrowing-down, it is possible to narrow further the N grid points down to the M grid points. The M grid points have a high probability of including the grid point located closest to the true position of the portable phone 2, and by selecting the grid point with the minimum difference between the geometric distance from the capturing object satellites and the pseudo distance calculated based on the GPS satellite signal among the M grid points, the initial position close to the true position of the portable phone 2 can be obtained.

Further, according to the present embodiment, even in the case in which an expected position with a confidence exceeding ±150 km is provided from the base station 3, by setting a corresponding number of frames to the confidence and narrowing down the grid points, it becomes possible to determine quickly and appropriately the initial position even with the positional error of ±1000 km or more in theory.

8. Modified Examples

8-1. Electronic Equipment

Although in the embodiment described above, the explanations are presented exemplifying the portable phone as the electronic equipment equipped with the positioning apparatus, a laptop personal computer, a personal digital assistant (PDA), a vehicle navigation system, and so on can also be adopted.

8-2. Satellite Positioning System

Further, in the embodiment described above, although the explanations are presented exemplifying the GPS as the satellite positioning system, other satellite positioning systems such as Wide Area Augmentation System (WAAS), Quasi Zenith Satellite System (QZSS), GLObal NAvigation Satellite System (GLONASS), or GALILEO can also be adopted.

8-3. Split of Processing

It is possible to arrange the system so that the calculation control section 31 of the baseband process circuit section 30 executes a part or the whole of the process to be executed by the host CPU 50. For example, although the explanations presented in the embodiment described above assume that the host CPU 50 executes the narrowing-down of the grid points and the positioning calculation (position converging calculation), it should be apparent from this disclosure that a configuration in which the calculation control section 31 executes these processes can also be adopted.

8-4. Determination on Appropriateness of Provisional Initial Position

Figure 21:
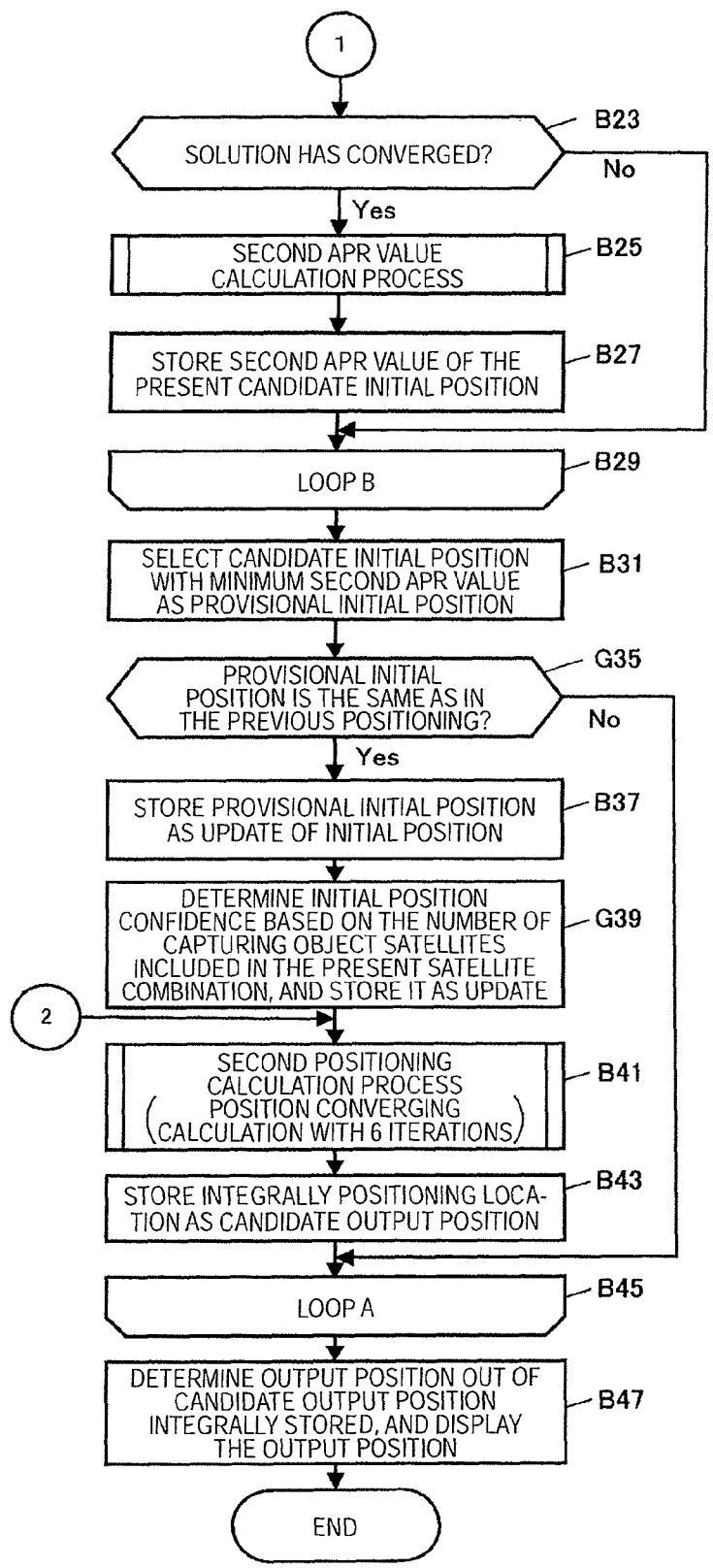
FIG. 21 is a view of a flowchart showing the flow of a second positioning process of the main process.

Although in the embodiment described above, the explanations are presented assuming that whether or not the provisional initial position is appropriate is determined by executing the Doppler check process, it is also possible to determine the appropriateness of the provisional initial position in a simple manner without executing the Doppler check process. The process in this case will be explained with reference to FIG. 21. Specifically, it is possible to execute the second positioning process substituting the step G35 and the step G39 shown in FIG. 21 for the steps B33, B35 and the step B39 of the positioning process described in FIGS. 14 and 15, respectively. FIG. 21 shows a flowchart of a part of the second positioning process corresponding to the positioning process shown in FIG. 15.

In the second positioning process, after determining the provisional initial position in the step B31, the host CPU 50 determines whether or not the provisional initial position thus determined is the same as the provisional initial position in the previous positioning (step G35). Then, if it is determined that they are not the same (No in the step G35), the host CPU 50 transfers the process to the next satellite combination.

Further, if it is determined that they are the same (Yes in the step G35), the host CPU 50 stores the provisional initial position, which is determined in the step B31, in the flash ROM 110 as an update of the initial position (step B37). In other words, in the case in which the same provisional initial position can be obtained consecutively, it is determined that the provisional initial position is appropriate.

Then, the host CPU 50 determines the initial position confidence based on the number of capturing object satellites included in the present satellite combination, and stores it in the flash ROM 110 as an update (step G39). Specifically, for example, in the case in which the number of capturing object satellites included in the present satellite combination is equal to or larger than 6, the initial position confidence is determined as 50 km, and in the case in which the number of capturing object satellites is 5, the initial position confidence is determined as 100 km. Further, in the case in which the number of capturing object satellites is 4, the initial position confidence is determined as 150 km. In other words, the larger the number of capturing object satellites is, the higher the initial position confidence is set to be.

8-5. Output Position

Although in the embodiment described above, the explanations are presented assuming that after determining the initial position, the second positioning calculation process using the initial position is executed to determine the output position, it is also possible to determine the initial position as the output position without executing the second positioning calculation process. This is because, according to the narrowing down of the grid points along the principle described above, the initial position close to the true position of the positioning apparatus can be obtained.

8-6. Narrowing Down of Grid Points

Although in the embodiment described above, the explanations are presented assuming that the first APR value is calculated with respect to each of the grid points using the difference between the fractional part of the geometric distance and the fractional part of the pseudo distance, it is also possible to perform the narrowing down of the grid points by calculating the first APR value using the difference between the entire geometric distance and the entire pseudo distance instead of using the fractional parts.

Further, it is also possible to perform the narrowing down of the grid points by calculating the APR value using the difference in Doppler frequency instead of calculating the APR value using the difference in distance. Specifically, the difference between the Doppler frequency calculated theoretically and the Doppler frequency actually measured is calculated with respect to each of the capturing object satellites, and the square sum of the respective differences is calculated, thereby obtaining the APR value. Then, by extracting the grid points with the smaller APR values, the grid points are narrowed down.

8-7. Frame and Grid Points

Although in the embodiment described above, the explanations are presented assuming that the grid points are disposed in the 300 km square frame in a reticular pattern with 50 km intervals, the intervals of the grid points can appropriately be changed. The smaller the intervals of the grid points are set to be, the closer to the true position the initial position can be obtained, and the more the amount of calculation increases.

Further, the shape of the frame is not necessarily required to be a rectangle, but can be arranged to be a circle. Similarly, the layout of the grid points is not necessarily required to be a reticular pattern, but can be, for example, a concentric pattern or a spiral pattern.

8-8. Satellite Combinations

Although in the embodiment described above, the explanations are presented assuming that the process of the steps B11 through B45 is executed with respect to all of the satellite combinations extracted in the step B9 in the positioning process shown in FIGS. 14 and 15, it is also possible to arrange that the process of the steps B11 through B45 is only executed on the satellite combinations, for example, with the PDOP value equal to or smaller than a predetermined threshold value, or the satellite combinations with the average value of the signal intensity of the captured GPS satellite signals equal to or more than a predetermined threshold value, among the satellite combinations extracted in the step B9. Thus, it becomes possible to reduce the amount of calculation.

Figure 22:
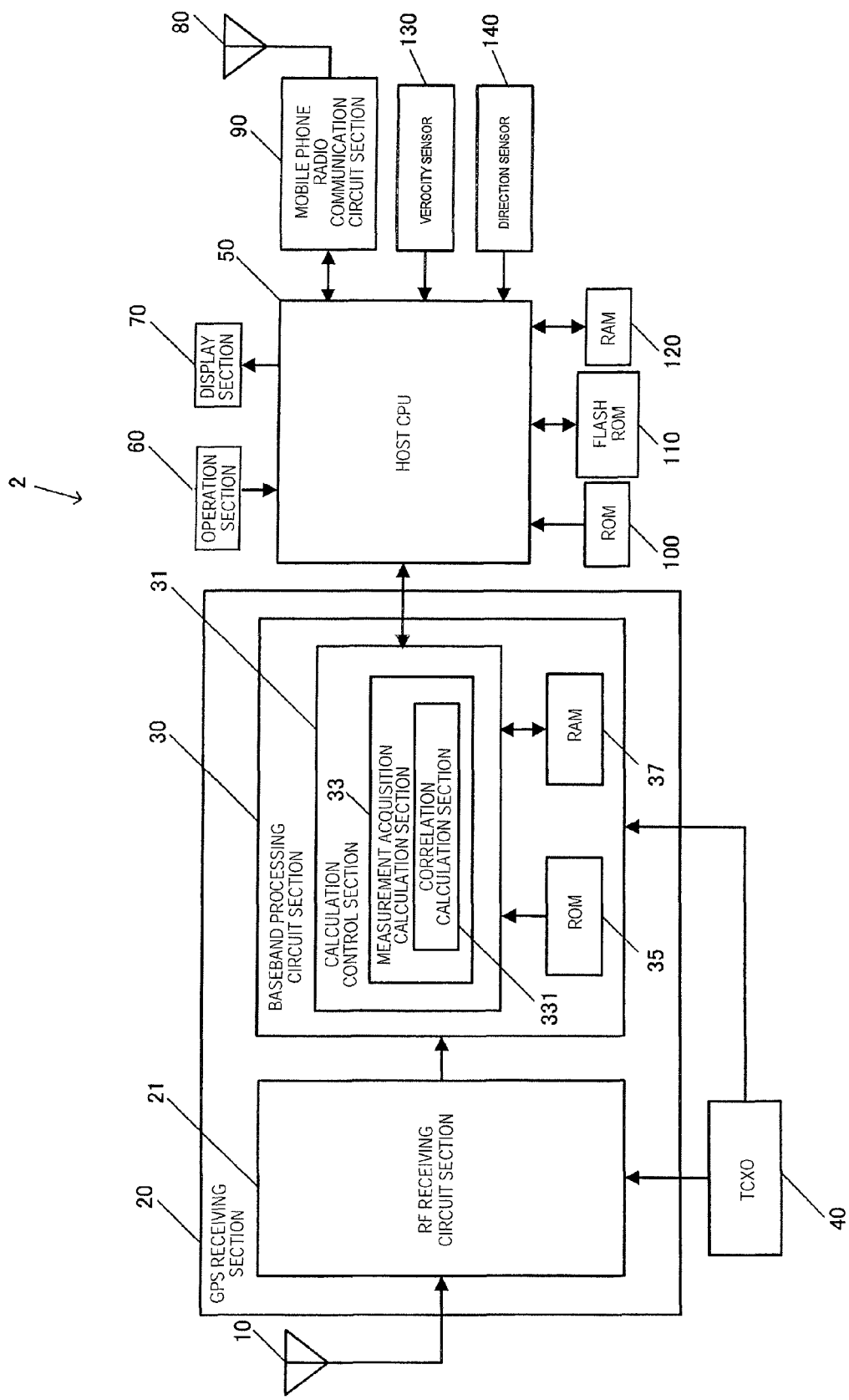
FIG. 22 is a view of a block diagram showing a functional configuration of a portable phone of a modified example.

8-9. Calculating Doppler Frequency Encompassing Velocity and Direction of Terminal In the Doppler check process, a Doppler frequency is calculable as follows. A velocity sensor 130 and a direction sensor 140 are added in the configuration of the portable phone 2, as shown in FIG. 22. The velocity sensor 130 detects a moving velocity of the portable phone 2 on the three orthogonal axis coordinate system (hereinafter referred to as a "sensor coordinate system"), and the direction sensor 140 detects a moving direction of the portable phone 2.

Figure 23:
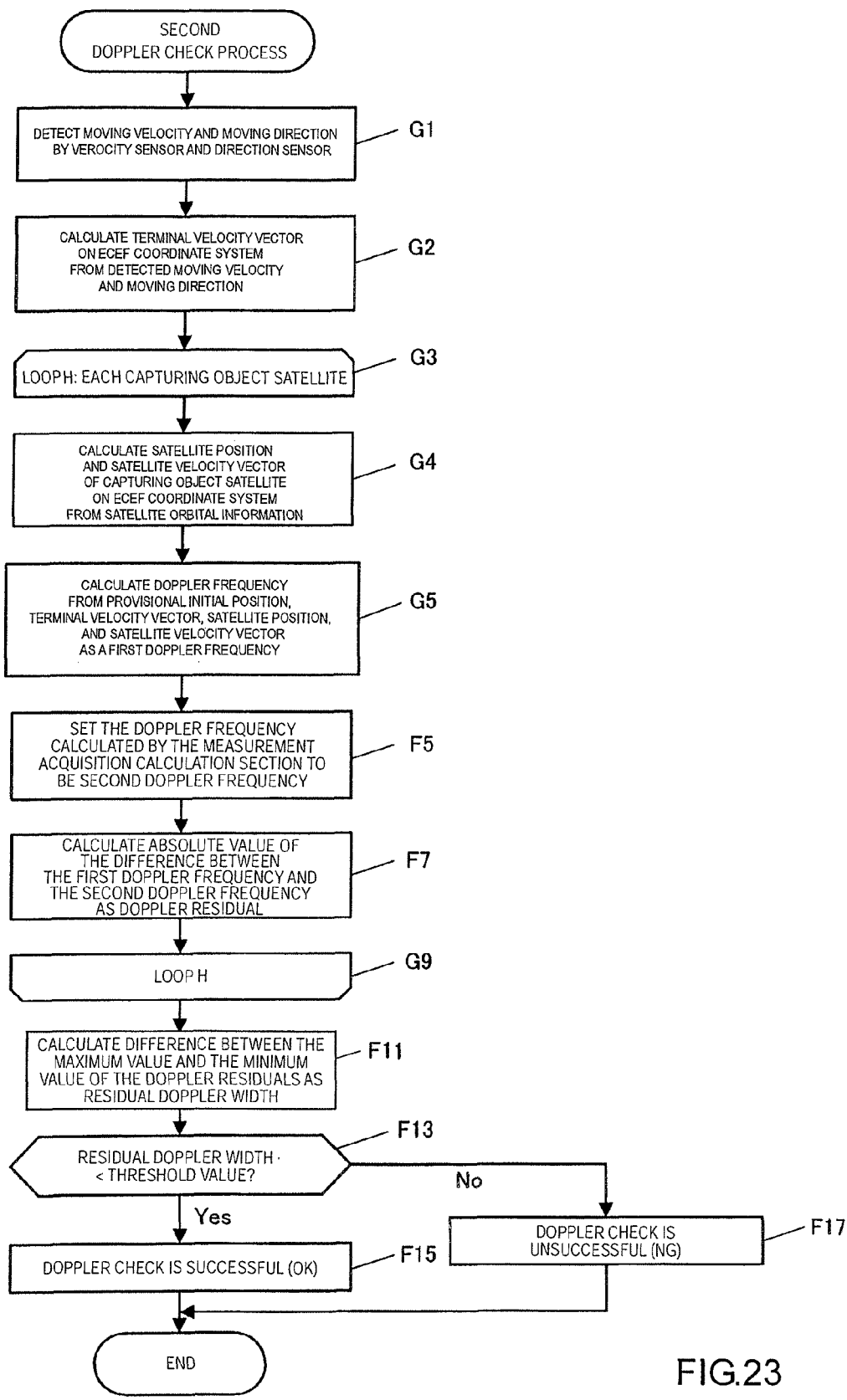
FIG. 23 is a view of a flowchart showing the flow of the second Doppler check process.

The host CPU 50 of the portable phone 2 executes a second Doppler check process shown in FIG. 23 instead of executing the Doppler check process shown in FIG. 19. In the second Doppler check process, a moving velocity vector of the portable phone 2 on the Earth-Centered Earth-Fixed (ECEF) coordinate system (hereinafter referred to as a "terminal velocity vector") is obtained in Steps G1 and G2. A moving velocity vector on ECEF coordinate system is calculable by calculating a moving velocity detected by the velocity sensor 130 and a moving direction detected by the direction sensor 140 in a known matrix calculation of coordinate transformation.

Then the host CPU 50 executes Steps G3 to G9 in Loop H for each capturing object satellite. Specifically, the host CPU calculates in Step G4 a position and the satellite velocity vector of a capturing object satellite on the ECEF coordinate system using satellite orbital information included in the satellite orbital data 113. Then in Step G5, a first Doppler frequency is obtained by calculating a Doppler frequency using the provisional initial position 125, the terminal velocity vector obtained in Step G2, the satellite position and the satellite velocity vector obtained in Step G4.

In terms of the velocity dimension, Doppler frequency is projective of a relative velocity vector of the terminal and the GPS satellite on the line of sight (from the position of the terminal towards the position of the satellite). Hence, Doppler frequency is calculable by obtaining a relative moving velocity based on the terminal velocity vector and the satellite velocity vector and further obtaining the line-of-sight direction based on the provisional initial position and the satellite position. It allows to obtain more accurately the Doppler frequency that encompasses not only the moving GPS satellites but also the moving terminal to enhance a more accurate determination as to whether the provisional initial position is appropriate or not.

General Interpretation of Terms

In understanding the scope of the invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the invention, the following directional terms "forward, rearward, above, downward, vertical, horizontal, below, and transverse" as well as any other similar directional terms refer to those directions of a GPS of the invention. Accordingly, these terms, as utilized to describe the invention should be interpreted relative to a GPS of the invention. Finally, terms of degree such as "substantially," "about," and "approximately" as used herein mean a reasonable amount of deviation of the modified term such that the end result is not significantly changed.

While only selected embodiments have been chosen to illustrate the invention, it will be apparent to those skilled in the art from this disclosure that various changes and modifications can be made herein without departing from the scope of the invention as defined in the appended claims. Furthermore, the foregoing descriptions of the embodiments according to the invention are provided for illustration only, and not for the purpose of limiting the invention as defined by the appended claims and their equivalents.

What is claimed is:

1. A method for determining an initial position by a processor for calculating a position of a receiver which receives signals from a plurality of satellites, the method comprising:
   a) determining a first satellite based on the signals at the receiver;
   b) determining a plurality of candidate points based on an erroneous position at the receiver;
   c) determining a selected candidate point from the plurality of candidate points at the receiver;
   d) calculating a first difference between a first measured range and a first calculated range corresponding to the first satellite at the receiver;
   e) calculating second differences between a second measured range and a second calculated range corresponding to satellites other than the first satellite at the receiver;
   f) producing a value indicating validity of the selected candidate point using the first difference and the second differences at the receiver;
   g) repeating steps c) through f) to produce the value indicating validity of each of the plurality of candidate points at the receiver;
   h) selecting at least one reliable point from the plurality of candidate points using the value indicating validity of each of the candidate point to execute position converging calculation at the receiver; and
   i) determining the initial position based on the at least one reliable point at the receiver, wherein
   the step f) includes calculating the value indicating validity of the selected candidate point by accumulating a subtraction result between the first difference and the second differences.

2. The method of claim 1, wherein
the erroneous position is a previous position of the receiver or a position information received from a base station.

3. The method of claim 1, wherein
the first calculated range is a fractional part of range between the selected candidate point and the first satellite, and
the second calculated range is a fractional part of range between the selected candidate point and the satellites other than the first satellite.

4. The method of claim 1, wherein
the first measured range is derived from the signal received from the first satellite, and
the second measured range is derived from the signal from at least one of the satellites other than the first satellite.

5. The method of claim 1, further comprising
increasing the number of the candidate points as an ambiguity of the erroneous position grows.

6. The method of claim 1, wherein
the step h) includes selecting a reliable point from the plurality of candidate points, where the reliable point has the least value indicating validity among the plurality of candidate points.

* * * * *